(12) United States Patent
Kobayashi

(10) Patent No.: US 7,188,607 B2
(45) Date of Patent: Mar. 13, 2007

(54) INTERNAL COMBUSTION ENGINE OF COMPRESSING AND AUTO-IGNITING AIR-FUEL MIXTURE AND METHOD OF CONTROLLING SUCH INTERNAL COMBUSTION ENGINE

(75) Inventor: Tatsuo Kobayashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 240 days.

(21) Appl. No.: 10/607,128

(22) Filed: Jun. 27, 2003

(65) Prior Publication Data

US 2005/0155344 A1    Jul. 21, 2005

(30) Foreign Application Priority Data

Jul. 4, 2002   (JP)   ............... 2002-196291

(51) Int. Cl.
F02B 7/00 (2006.01)
F02B 7/02 (2006.01)

(52) U.S. Cl. .................... 123/431; 123/299

(58) Field of Classification Search ........... 123/431, 123/299, 300, 301, 302, 303, 304, 305, 575, 123/576, 577, 179.7, 179.8, 179.16
See application file for complete search history.

(56) References Cited

U.S. PATENT DOCUMENTS

| 3,924,598 | A | * | 12/1975 | Davis | 123/306 |
| 4,254,741 | A | | 3/1981 | Werling et al. | |
| 4,414,940 | A | * | 11/1983 | Loyd | 123/299 |
| 4,612,898 | A | | 9/1986 | Steiger et al. | |
| 4,748,949 | A | | 6/1988 | Steiger et al. | |
| 5,076,229 | A | * | 12/1991 | Stanley | 123/289 |
| 5,243,940 | A | * | 9/1993 | Gopel | 123/299 |
| 5,365,902 | A | * | 11/1994 | Hsu | 123/299 |
| 5,941,210 | A | * | 8/1999 | Hill et al. | 123/305 |
| 6,227,151 | B1 | | 5/2001 | Ma | |
| 6,341,487 | B1 | | 1/2002 | Takahashi et al. | |
| 6,354,264 | B1 | | 3/2002 | Iwakiri et al. | |
| 6,390,057 | B2 | | 5/2002 | Yoshizawa et al. | |
| 6,494,064 | B1 | | 12/2002 | Pena | |
| 6,659,071 | B2 | | 12/2003 | LaPointe et al. | |

(Continued)

FOREIGN PATENT DOCUMENTS

JP    A-63-068728    3/1988

(Continued)

Primary Examiner—Mahmoud Gimie
(74) Attorney, Agent, or Firm—Oliff & Berridge, PLC

(57) ABSTRACT

The technique of the present invention produces a first fuel-air mixture containing a first fuel and the air at a specific ratio, which does not allow for auto ignition of the first fuel-air mixture by simple compression, in a combustion chamber. The technique then injects a second fuel, which has a higher octane value than that of the first fuel, into a partial area of the combustion chamber, so as to produce a second fuel-air mixture. The technique ignites the second fuel-air mixture for combustion, so as to compress and auto-ignite the first fuel-air mixture. The second fuel has the higher octane value, so that a combustion start timing of the second fuel-air mixture is reliably regulated by ignition. Namely the technique positively controls the timing of auto ignition of the first fuel-air mixture. Setting an adequate value to the ignition timing thus effectively prevents the occurrence of knocking.

25 Claims, 18 Drawing Sheets

U.S. PATENT DOCUMENTS

| | | | |
|---|---|---|---|
| 6,684,849 B2 * | 2/2004 | zur Loye et al. | 123/295 |
| 6,684,852 B2 * | 2/2004 | Wright et al. | 123/431 |
| 2002/0007816 A1 | 1/2002 | Zur Loye et al. | |

FOREIGN PATENT DOCUMENTS

| | | |
|---|---|---|
| JP | A 4-31649 | 2/1992 |
| JP | A-06-235329 | 8/1994 |
| JP | A 11-101127 | 4/1999 |
| JP | A-2000-130171 | 5/2000 |
| JP | A-2000-220484 | 8/2000 |
| JP | A-2000-227023 | 8/2000 |
| JP | A 2001-3800 | 1/2001 |
| JP | A 2001-254660 | 9/2001 |
| JP | A 2001-263067 | 9/2001 |
| JP | A-2002-089267 | 3/2002 |
| JP | A-2002-155748 | 5/2002 |
| JP | A-2002-180885 | 6/2002 |
| WO | WO 99/06683 | 2/1999 |

* cited by examiner

INTERNAL COMBUSTION ENGINE OF COMPRESSING AND AUTO-IGNITING AIR-FUEL MIXTURE AND METHOD OF CONTROLLING SUCH INTERNAL COMBUSTION ENGINE

BACKGROUND OF THE INVENTION

1. Field of the Invention

The present invention relates to a technique of compressing and auto-igniting an air-fuel mixture of a fuel and the air in a combustion chamber and thereby taking out power. More specifically, the invention pertains to a technique of controlling auto ignition of the air-fuel mixture to take out power with a high efficiency, while effectively reducing emission of air pollutants through combustion.

2. Description of the Related Art

Internal combustion engines produce large power by relatively small-sized bodies and are thus widely used as power sources of diverse transportation devices like automobiles, ships, and aircraft as well as stationary power sources in factories. The operation principle of such internal combustion engines makes a fuel subjected to combustion in a combustion chamber, converts a pressure produced through the combustion into a mechanical work, and outputs the converted mechanical work.

For protection of the global environment, reducing the emission of air pollutants from the internal combustion engine is highly demanded. Another strong demand is further reduction of the fuel consumption, in order to lower the emission of carbon dioxide as a cause of global warming and reduce the driving cost of the internal combustion engine.

One measure to meet these requirements is application of a combustion system that compresses and auto-ignites an air-fuel mixture in a combustion chamber (in the specification hereof, this combustion system is referred to as 'premix compression ignition combustion system') to the internal combustion engine. As described later in detail, the internal combustion engine adopting the premix compression ignition combustion system is expected to simultaneously and significantly reduce the emission of the air pollutants included in the exhaust gas and the fuel consumption. This combustion system compresses and auto-ignites the air-fuel mixture. Under some driving conditions of the internal combustion engine, the timing of auto-igniting the air-fuel mixture is too early, and the air-fuel mixture is undesirably auto-ignited in the course of compression. This leads to the occurrence of severe knocking.

One proposed technique forms an air-fuel mixture having a gradually decreasing concentration of a fuel in the combustion chamber and ignites part of the air-fuel mixture having a greater concentration of the fuel, so as to control the timing of auto ignition of the remaining air-fuel mixture (PATENT LAID-OPEN GAZETTE No. 2001-254660). This proposed technique ignites and combusts the part of the air-fuel mixture, so as to raise the internal pressure of the combustion chamber and compress and auto-ignite the remaining part of the air-fuel mixture. A delay time to auto ignition of the compressed air-fuel mixture (auto ignition delay time) is lengthened with a decrease in concentration of the fuel. The compressed remaining air-fuel mixture is thus not auto-ignited all at once, but auto ignition starts successively from part of the remaining air-fuel mixture having a greater concentration of the fuel. Regulating the ignition timing of the air-fuel mixture controls the timing of starting the successive auto ignition of the air-fuel mixture and prevents the occurrence of knocking.

Such prior art technique, however, has difficulties in reliably controlling the timing of auto ignition of the air-fuel mixture and in preventing the occurrence of knocking. The fuel is to be mixed with the air to produce the air-fuel mixture, prior to ignition. A certain time period is required for mixing the fuel with the air between injection of the fuel into the combustion chamber and actual ignition of the air-fuel mixture. Under some driving conditions of the internal combustion engine, however, the air-fuel mixture is auto-ignited before the fuel and the air are sufficiently mixed with each other. In such cases, the air-fuel mixture is auto-ignited prior to ignition. Namely the timing of auto ignition of the air-fuel mixture is not controllable by regulating the ignition timing.

The decrease in concentration of the fuel in the whole combustion chamber naturally lengthens the auto ignition delay time and prevents auto ignition of the air-fuel mixture prior to ignition. The excessively low concentration of the fuel, however, makes it hard to ignite the air-fuel mixture.

SUMMARY OF THE INVENTION

The object of the present invention is thus to solve the drawbacks of the prior art techniques described above and to provide a technique of effectively controlling the timing of auto ignition of an air-fuel mixture in an internal combustion engine that adopts the premix compression ignition combustion system.

In order to attain at least part of the above and other related objects, the present invention is directed to an internal combustion engine that compresses an air-fuel mixture containing a fuel and the air in a combustion chamber and makes the compressed air-fuel mixture subjected to combustion, so as to output power.

The internal combustion engine includes: an air-fuel mixture compression mechanism that compresses the air-fuel mixture in the combustion chamber; a first fuel-air mixture production module that produces a first fuel-air mixture containing a first fuel and the air at a specific ratio, which avoids auto ignition of the first fuel-air mixture through the compression by the air-fuel mixture compression mechanism, in the combustion chamber; a second fuel-air mixture production module that supplies a second fuel, which is different from the first fuel, into a partial area of the combustion chamber, so as to produce a second fuel-air mixture; and an ignition module that ignites the second fuel-air mixture, so as to compress and auto-ignite the first fuel-air mixture.

There is a control method corresponding to the internal combustion engine described above. The present invention is accordingly directed to a control method of an internal combustion engine, which compresses an air-fuel mixture containing a fuel and the air in a combustion chamber and makes the compressed air-fuel mixture subjected to combustion, so as to output power.

The control method includes: a first step of producing a first fuel-air mixture containing a first fuel and the air at a specific ratio, which avoids auto ignition of the first fuel-air mixture through the compression, in the combustion chamber; a second step of supplying a second fuel, which is different from the first fuel, into a partial area of the combustion chamber, so as to produce a second fuel-air mixture; and a third step of igniting the second fuel-air mixture, so as to compress and auto-ignite the first fuel-air mixture.

There is also a control apparatus corresponding to the control method described above. The present invention is accordingly directed to a control apparatus for an internal combustion engine, which compresses an air-fuel mixture containing a fuel and the air in a combustion chamber and makes the compressed air-fuel mixture subjected to combustion, so as to output power.

The control apparatus includes: a first fuel-air mixture production module that produces a first fuel-air mixture containing a first fuel and the air at a specific ratio, which avoids auto ignition of the first fuel-air mixture through the compression, in the combustion chamber; a second fuel-air mixture production module that supplies a second fuel, which is different from the first fuel, into a partial area of the combustion chamber, so as to produce a second fuel-air mixture; and an ignition module that ignites the second fuel-air mixture, so as to compress and auto-ignite the first fuel-air mixture.

In any of the internal combustion engine, the control method of the internal combustion engine, and the control apparatus for the internal combustion engine according to the present invention, the technique produces the first fuel-air mixture containing the first fuel and the air at a specific ratio, which avoids auto ignition of the first fuel-air mixture by simple compression, in the combustion chamber. The technique then supplies the second fuel, which is different from the first fuel, to a partial area of the combustion chamber to produce the second fuel-air mixture. The technique ignites the second fuel-air mixture to heighten the internal pressure of the combustion chamber and thereby compress and auto-ignite the first fuel-air mixture.

The first fuel-air mixture is not auto-ignited by simple compression in the combustion chamber. The second fuel is different from the first fuel, and auto ignition of the second fuel-air mixture, which is produced in the combustion chamber, in the course of compression is thus controllable under different conditions from those for the first fuel-air mixture. The second fuel-air mixture starts combustion by ignition, and the combustion of the second fuel-air mixture leads to compression and auto ignition of the first fuel-air mixture. Regulating the ignition timing of the second fuel-air mixture ensures auto ignition of the first fuel-air mixture at a desired timing. Regardless of the driving conditions of the internal combustion engine, such control ensures smooth operations of the internal combustion engine with no occurrence of knocking, while compressing and auto-igniting the first fuel-air mixture. As discussed later, it is known that the system of driving the internal combustion engine with compression and auto ignition of the air-fuel mixture simultaneously and significantly reduces the emission of air pollutants from the internal combustion engine and the fuel consumption of the internal combustion engine. Driving the internal combustion engine under any driving conditions with compression and auto ignition of the air-fuel mixture desirably reduces the emission of the air pollutants and the fuel consumption.

In any of the internal combustion engine, the control method, and the control apparatus, a fuel of a higher flame resistance than that of the first fuel, for example, a fuel having a higher octane value than that of the first fuel, may be used as the second fuel. The fuel having a higher octane value effectively prevents the occurrence of knocking.

Another applicable procedure injects a combustible gas as the second fuel to produce the second fuel-air mixture. Still another applicable procedure injects an alcohol as the second fuel to produce the second fuel-air mixture. The gaseous fuel injected as the second fuel is quickly mixed with the air to produce the second fuel-air mixture and thus preferably ensures reliable ignition. Alcohols have greater heat values per unit volume than the combustible gases. Other advantages of using the alcohol are non-requirement of previous pressurization and easy handling.

Typical examples of the combustible gas include hydrogen gas, methane gas, ethane gas, natural gas, and propane gas. Typical examples of the alcohol include methyl alcohol and ethyl alcohol. These examples are readily available and are thus preferably used as the second fuel.

Among such combustible gases, hydrogen gas is especially hard to be auto-ignited but is readily ignitable. The hydrogen gas used as the second fuel thus allows for reliable ignition of the second fuel-air mixture and desirably ensures auto ignition of the first fuel-air mixture at a desired timing.

Another characteristic of the hydrogen gas is a short ignition delay time, which represents a time period between emission of a spark and actual ignition. Even when the varied production state of the air-fuel mixture in the combustion chamber tends to vary the ignition delay time, use of the hydrogen gas as the second fuel does not significantly vary the ignition timing of the second fuel-air mixture. The use of the hydrogen gas thus preferably ensures compression and auto ignition of the first fuel-air mixture at a desired timing.

Among the alcohols, especially methyl alcohol is preferable as the second fuel, because of its availability and high octane value.

In the internal combustion engine discussed above, under driving conditions with little possibility of the occurrence of knocking, the first fuel-air mixture of the first fuel and the air may be compressed and auto-ignited without injection of the second fuel. The procedure detects a required torque to be output from the internal combustion engine, and when the detected required torque is smaller than a preset threshold value, produces a third fuel-air mixture, instead of the first fuel-air mixture, in the combustion chamber. Here the third fuel-air mixture is a mixture of the first fuel and the air at a preset ratio that allows for auto ignition of the third fuel-air mixture by simple compression in the combustion chamber. In the case of no injection of the second fuel, the air-fuel mixture produced in the combustion chamber may not be ignited.

Under the conditions of a small required torque, there is little possibility of the occurrence of knocking. In such cases, the air-fuel mixture is auto-ignited in the combustion chamber without injection of the second fuel. This arrangement desirably saves second fuel. Ignition of the air-fuel mixture in the combustion chamber is not required in the case of auto ignition of the mixture of the first fuel and the air.

In the internal combustion engine that injects a combustible gas as the second fuel, one preferable arrangement lifts a piston up in the combustion chamber to compress the air-fuel mixture and makes the second fuel directly injected into the combustion chamber to produce the second fuel-air mixture in a preset term from 30 degrees as a rotational angle of the crankshaft prior to a top dead center in a compression cycle, at which the piston reaches its maximum height after compression of the air-fuel mixture, to the top dead center in the compression cycle.

The injected combustible gas is quickly mixed with the air. In the structure of direct injection of a combustible gas as the second fuel into the combustion chamber, the combustible gas is injected in the preset term from 30 degrees as the rotational angle of the crankshaft prior to the top dead center in the compression cycle to the top dead center in the compression cycle. This arrangement facilitates production of the second fuel-air mixture in the combustion chamber.

The internal combustion engine may have a recess, which is formed on a top face of the piston, where the second fuel directly injected into the combustion chamber forms the second fuel-air mixture.

Production of the second fuel-air mixture in the recess formed on the top face of the piston effectively prevents the second fuel-air mixture from spreading over the combustion chamber. This arrangement thus ensures reliable ignition of the second fuel-air mixture.

The recess may be located on a substantial center on the top face of the piston.

When the recess is located on the substantial center on the top face of the piston, the second fuel-air mixture is produced in a substantial center of the combustion chamber. The location of igniting the second fuel-air mixture is thus also the substantial center in the combustion chamber. The ignition module to ignite the air-fuel mixture is relatively easily positioned in the substantial center of the combustion chamber. Arrangement of the recess on the substantial center on the top face of the piston thus preferably facilitates designing of the combustion chamber.

The recess may have a rim defined by a side wall of the recess crossing the top face of the piston to at least partly form a sharp edge.

The recess designed to have at least part of the rim form a sharp edge prevents the second fuel-air mixture produced in the recess from flowing over the recess and spreading over the combustion chamber. This arrangement desirably ensures effective ignition of the second fuel-air mixture.

A second recess may additionally be formed at a specific position, which faces the recess formed on the top face of the piston, on an inner face of the combustion chamber opposed to the top face of the piston.

The presence of the second recess enables the second fuel-air mixture to be produced in a space between the recess formed on the top face of the piston and the second recess, as the piston moves up. This arrangement desirably ensures effective ignition of the second fuel-air mixture.

In one preferable structure, the top face of the piston has a guide groove to guide the fuel directly injected into the combustion chamber to the recess.

The guide groove functions to guide the injected fuel to the recess and thereby allows for efficient production of the second fuel-air mixture in the recess. This structure thus ensures effective ignition of the second fuel-air mixture.

In the internal combustion engine of the present invention, the second fuel may be injected into the combustion chamber to produce the second fuel-air mixture at a certain time specified relative to an ignition timing of the second fuel-air mixture by the ignition module.

This arrangement constantly keeps the adequate time interval between injection of the second fuel and ignition of the second fuel-air mixture by means of the ignition module, thus desirably ensuring effective ignition of the second fuel-air mixture.

One preferable application detects a factor of delaying an ignition timing of the second fuel-air mixture in the internal combustion engine, and when the detected factor reaches or exceeds a preset level, delays the ignition timing. The delay factor may be, for example, a frequency of occurrence of knocking in the internal combustion engine (including occurrence or non-occurrence of knocking) and a concentration of nitrogen oxides included in an exhaust gas discharged from the combustion chamber. When the occurrence of knocking is detected or when the frequency of occurrence of knocking reaches or exceeds a preset level, one preferable procedure delays an ignition timing of the second fuel-air mixture, as well as an injection timing of the second fuel.

When the ignition timing of the second fuel-air mixture is too early and causes knocking or a rise in concentration of nitrogen oxides in the exhaust gas, the delayed ignition timing effectively prevents the occurrence of knocking and the emission of nitrogen oxides. The delayed injection timing of the second fuel in combination with the delayed ignition timing preferably enables the second fuel-air mixture to be positively ignited in the case of the delayed ignition timing.

In the internal combustion engine that injects an alcohol as the second fuel, one preferable arrangement lifts a piston up in the combustion chamber to compress the air-fuel mixture and makes the second fuel directly injected into the combustion chamber to produce the second fuel-air mixture in a preset term from 90 degrees as a rotational angle of the crankshaft prior to a top dead center in a compression cycle, at which the piston reaches its maximum height after compression of the air-fuel mixture, to 30 degrees as a rotational angle of the crankshaft prior to the top dead center in the compression cycle.

In the structure of using an alcohol as the second fuel, the alcohol is injected in the preset term from 90 degrees to 30 degrees as the rotational angles of the crankshaft prior to the top dead center in the compression cycle. This arrangement ensures preferable production of the second fuel-air mixture.

In the internal combustion engine equipped with an intake conduit, which a flow of the air supplied into the combustion chamber passes through, and an intake valve that opens and closes the intake conduit, one preferable arrangement makes the first fuel injected into the intake conduit upstream the intake valve to produce the first fuel-air mixture, while making the second fuel injected into the combustion chamber to produce the second fuel-air mixture.

Injection of the fuel into the upstream of the intake valve is easier than injection of the fuel into the combustion chamber. Injection of the first fuel into the upstream of the intake valve thus preferably facilitates production of the first fuel-air mixture in the combustion chamber.

In the internal combustion engine equipped with a conversion catalyst disposed in an exhaust conduit, which a flow of an exhaust gas discharged from the combustion chamber passes through, to convert harmful components included in the exhaust gas, one preferable arrangement makes the second fuel injected from an upstream side of the conversion catalyst into the exhaust conduit and ignites the injected second fuel, so as to warm the conversion catalyst up.

The conversion catalyst at low temperatures can not effectively convert the harmful components, such as air pollutants, included in the exhaust gas. The arrangement of making the second fuel injected from the upstream side to the conversion catalyst and igniting the injected second fuel to warm the conversion catalyst up desirably enables the conversion catalyst to efficiently convert the harmful components in the exhaust gas.

The internal combustion engine may be constructed to change its drive mode between a 2-cycle drive mode and a 4-cycle drive mode. The internal combustion engine of this arrangement has: a mechanism that rotates a crankshaft to lift a piston up in the combustion chamber and thereby compress the air-fuel mixture in the combustion chamber; an intake valve and an exhaust valve that respectively open and close an intake conduit and an exhaust conduit synchronously with the rotation of the crankshaft; and a drive mode changeover module that varies open and close timings of the intake valve and the exhaust valve and thereby changes over the drive mode of the internal combustion engine between a 4-cycle drive mode and a 2-cycle drive mode. One preferable arrangement measures a rotation speed of the crankshaft, and controls the drive mode changeover module to make the internal combustion engine driven in the 4-cycle drive mode when the measured rotation speed is not greater than a predetermined threshold value, while making the internal combustion engine driven in the 2-cycle drive mode when the measured rotation speed exceeds the predetermined threshold value.

The internal combustion engine driven in the 2-cycle drive mode relatively facilitates auto-ignition of the air-fuel mixture and thereby ensures output of a greater torque. The 2-cycle drive mode, however, makes it hard to drive the internal combustion engine at a high rotation speed. Changeover of the drive mode between the 2-cycle drive mode and the 4-cycle drive mode desirably allows for driving of the internal combustion engine at a high rotation speed, while facilitating auto ignition of the air-fuel mixture.

In the internal combustion engine of this application, the intake valve and the exhaust valve may be driven with electric power. At least either one of a supply and a cutoff of electric power is carried out to actuate the intake valve and the exhaust valve.

The intake valve and the exhaust valve actuated in this manner preferably enable the drive mode of the internal combustion engine to be changed over between the 2-cycle drive mode and the 4-cycle drive mode by supplying or cutting off the electric power at an adequate timing synchronously with the rotation of the crankshaft.

The above and other objects, features, aspects, and advantages of the present invention will become more apparent from the following detailed description of the preferred embodiments with the accompanying drawings.

DESCRIPTION OF THE PREFERRED EMBODIMENTS

Some modes of carrying out the invention are discussed below with reference to the accompanied drawings in the following sequence:

A. First Embodiment
  A-1. Structure of System
  A-2. Outline of Engine Control
  A-3. Combustion Control of Air-Fuel Mixture in First Embodiment
  A-4. Modifications B. Second Embodiment
  B-1. Structure of System
  B-2. Combustion Control of Air-Fuel Mixture in Second Embodiment

A. First Embodiment

A-1. Structure of System

Figure 1:
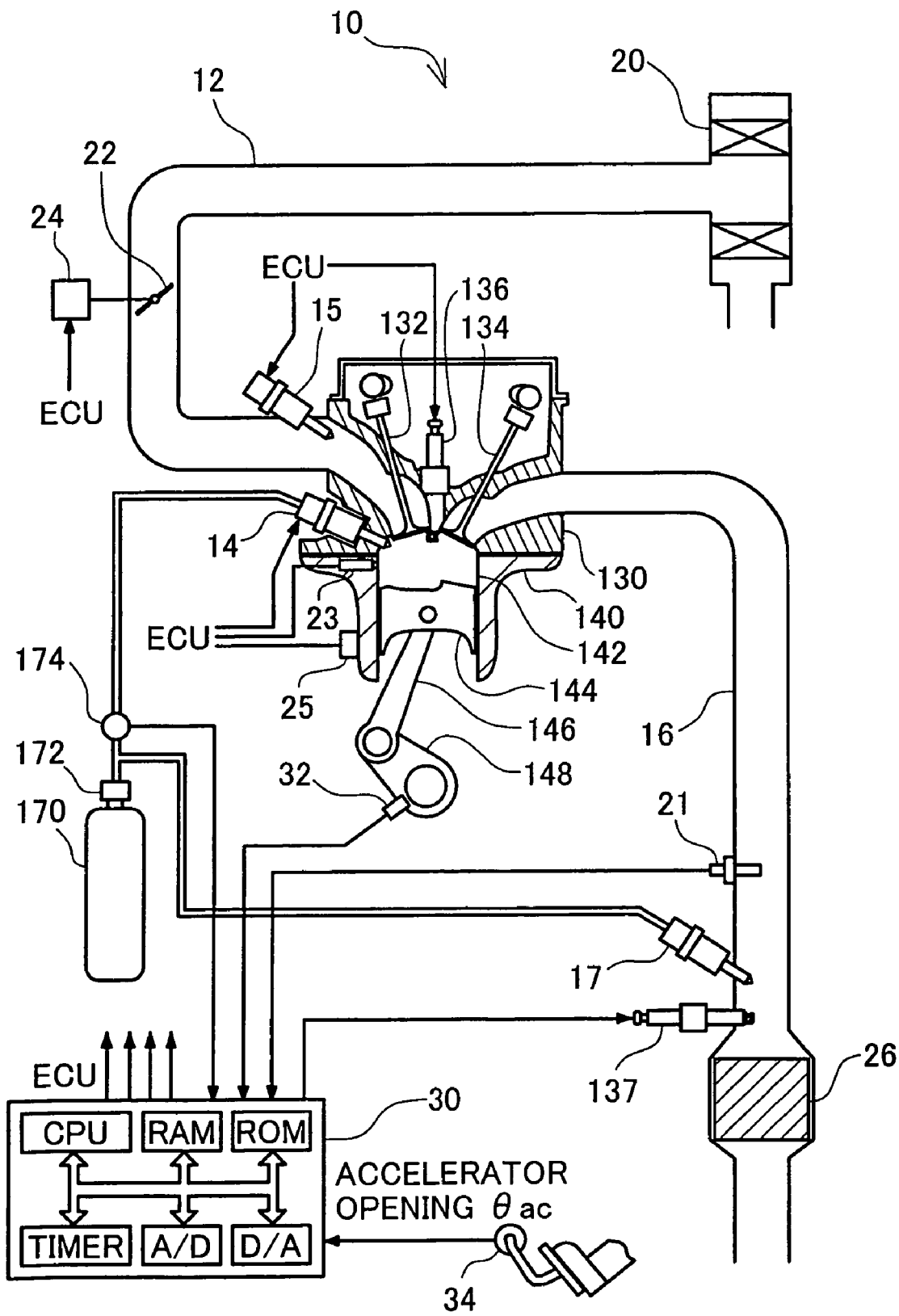
FIG. 1 conceptually illustrates the structure of an engine in a first embodiment of the present invention that adopts the premix compression ignition combustion system.

FIG. 1 conceptually illustrates the structure of an engine 10 in a first embodiment of the present invention that adopts the premix compression ignition combustion system. The engine 10 of the first embodiment is a 4-cycle engine that makes the air-fuel mixture combusted in a combustion chamber to output power through repetition of four cycles of air intake, compression, expansion, and exhaust. For distinct illustration of the structure of the engine 10, the cross section is taken on a substantial center of the combustion chamber in FIG. 1. A main body of the engine 10 has a cylinder head 130 mounted on an upper portion of a cylinder block 140. A cylindrical cylinder 142 is arranged inside the cylinder block 140, and a piston 144 vertically slides in the cylinder 142. The space defined by the cylinder 142, the piston 144, and the lower face of the cylinder head 130 forms a combustion chamber.

The piston 144 is connected to a crankshaft 148 via a connecting rod 146, and vertically moves in a slidable manner in the cylinder 142 with rotations of the crankshaft 148.

The cylinder head 130 connects with an intake conduit 12 to make the intake air flown into the combustion chamber, a spark plug 136 to ignite the air-fuel mixture in the combustion chamber, and an exhaust conduit 16 to discharge a combustion gas produced in the combustion chamber. The cylinder head 130 has an intake valve 132 and an exhaust valve 134. The intake valve 132 and an exhaust valve 134 are respectively driven by cam mechanisms to open and close the intake conduit 12 and the exhaust conduit 16 synchronously with the movement of the piston 144.

An air cleaner 20 is arranged upstream the intake conduit 12. A filter for removing foreign substances in the air is built in the air cleaner 20. The intake air of the engine 10 passes through the air cleaner 20 to be subjected to removal of foreign substances by means of the built-in filter and is then taken into the combustion chamber. The intake conduit 12 has a throttle valve 22. An electric actuator 24 is driven to control the throttle valve 22 to an adequate opening, so as to regulate the quantity of the air taken into the combustion chamber.

The engine 10 of the embodiment has two fuel injection valves, that is, a fuel injection valve 15 disposed in the intake conduit 12 and a fuel injection valve 14 disposed in the cylinder head 130. A supply of gasoline is injected from the fuel injection valve 15 into the intake conduit 12, whereas a supply of hydrogen gas is injected from the fuel injection valve 14 into the combustion chamber. The hydrogen gas is pressurized and stored in a hydrogen storage tank 170, and is supplied to the fuel injection valve 14 after pressure reduction to a predetermined level by means of a regulator 172. The gasoline is stored in a gasoline tank (not shown), is raised with a fuel pump (not shown), and is supplied to the fuel injection valve 15. In this embodiment, the hydrogen gas is injected from the fuel injection valve 14. The hydrogen gas is, however, not restrictive, and another gaseous fuel different from gasoline, for example, methane, ethane, propane, or natural gas, or a liquid fuel may be injected from the fuel injection valve 14. Alcohol fuels like methanol and ethanol are preferable examples of the liquid fuel. These fuels have higher octane ratings than gasoline and are not readily subjected to auto ignition by compression.

A catalyst 26 is arranged downstream the exhaust conduit 16 to convert air pollutants included in the exhaust gas. As discussed later, the premix compression ignition combustion system significantly reduces the total concentration of the air pollutants in the exhaust gas. The arrangement of the catalyst 26 in the exhaust conduit 16 allows for substantially complete removal of the air pollutants, which slightly remain in the exhaust gas. When the temperature of the catalyst 26 is not sufficiently high, for example, at the time immediately after a start of the engine 10, the catalyst 26 can not effectively convert the air pollutants included in the exhaust gas. A fuel injection valve 17 and a spark plug 137 are accordingly disposed in the exhaust conduit 16 upstream the catalyst 26. The gaseous fuel injected from the fuel injection valve 17 is ignited with the spark plug 137 to quickly raise the temperature of the catalyst 26 and attain effective conversion of the air pollutants.

The operations of the engine 10 are controlled by an engine control unit (hereafter referred to as ECU) 30. The ECU 30 is constructed as a known microcomputer including a CPU, a RAM, a ROM, an A/D conversion element, and a D/A conversion element, which are mutually connected via a bus. The ECU 30 detects an engine rotation speed Ne and an accelerator opening θac and controls the throttle valve 22 to an adequate opening based on the results of the detection. The engine rotation speed Ne is measured by a crank angle sensor 32 located on an end of the crankshaft 148. The accelerator opening θac is measured by an accelerator opening sensor 34 built in an accelerator pedal. The ECU 30 also has control over the fuel injection valves 14, 15, and 17 and the spark plugs 136 and 137. The ECU 30 further detects a pressure of the hydrogen gas supplied to the fuel injection valve 14 by means of a pressure sensor 174 and has control to ensure constant supply of the hydrogen gas under an adequate pressure.

The ECU 30 also detects the occurrence of knocking, based on outputs of a knocking sensor 25 disposed in the cylinder block 140. The knocking sensor 25 measures vibrations of an air column arising in the cylinder 142, accompanied with the occurrence of a knocking in the combustion chamber, by taking advantage of the resonance, and thereby detects the occurrence of the knocking. The knocking sensor 25 may be replaced by a pressure sensor 23 that is located in either the cylinder block 140 or the cylinder head 130 and measures the pressure in the combustion chamber. In the structure with the pressure sensor 23 instead of the knocking sensor 25, the ECU 30 reads the pressure in the combustion chamber measured by the pressure sensor 23 and calculates a rate of a pressure rise in the combustion chamber, so as to detect the occurrence of a knocking.

The ECU 30 reads the outputs of a NOx sensor 21, which is located in the exhaust conduit 16 upstream the catalyst 26, so as to detect the concentration of nitrogen oxides included in the exhaust gas.

The fuel injection valve 14 is disposed on the air intake side in the illustration of FIG. 1, but may alternatively be disposed on the exhaust side. The arrangement of the fuel injection valve 14 on the air intake side does not make the exhaust gas flow above the fuel injection valve 14 and thus advantageously protects the fuel injection valve 14 from high temperatures. The exhaust port has a smaller cross sectional area and a higher degree of freedom in designing the shape, compared with the air intake port. The arrangement of the fuel injection valve 14 on the exhaust side thus advantageously enables the fuel injection valve 14 to be located at a suitable position.

Figure 2A:
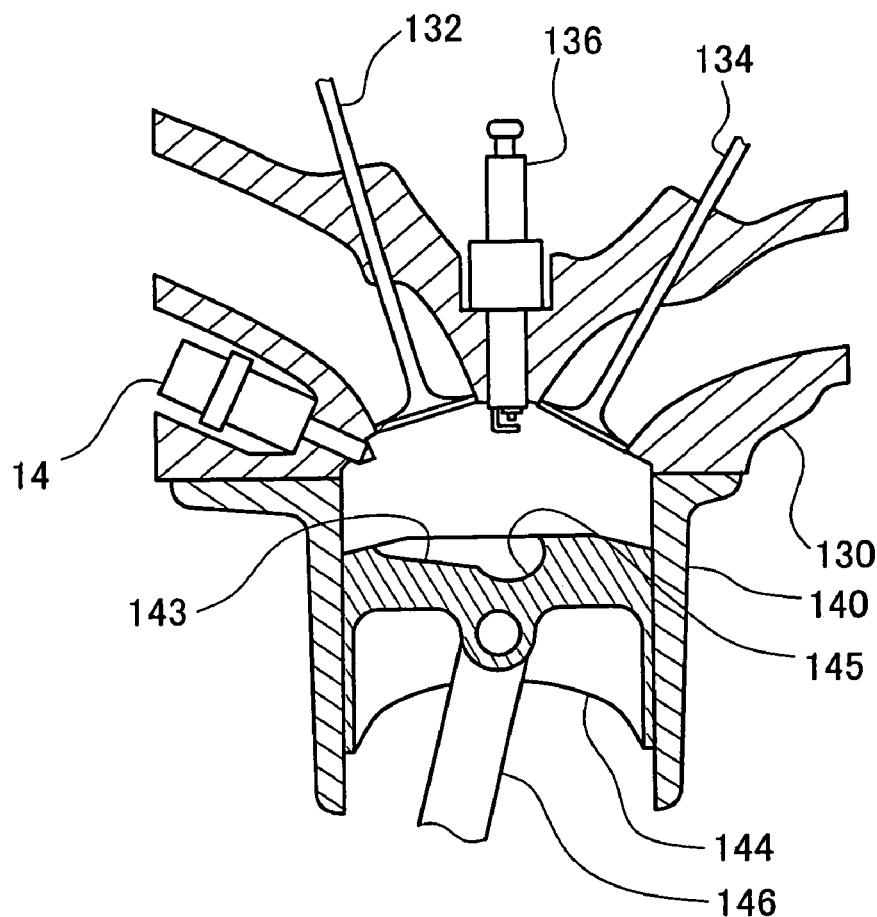
FIGS. 2A, 2B and 2C show the structure of a combustion chamber in the engine of the first embodiment.
Figure 2B:
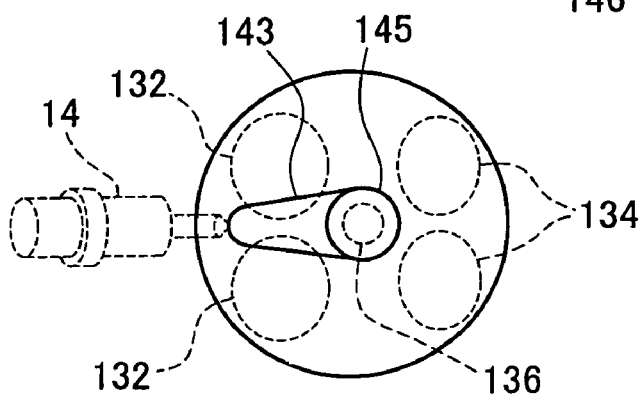
Figure 2C:
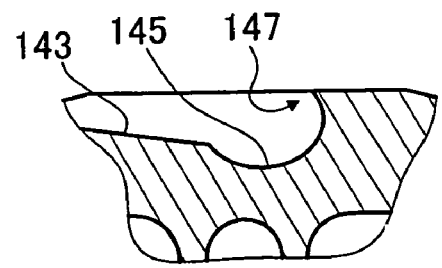

FIG. 2 shows the structure of the combustion chamber in the engine 10. FIG. 2A is a sectional view showing the cross section of the combustion chamber. As illustrated, a guide groove 143 and a recess 145 are formed on the top face of the piston 144 to guide the flow of hydrogen gas injected from the fuel injection valve 14 to the spark plug 136. FIG. 2B is a top view showing the top face of the piston 144, which is a constituent of the combustion chamber, from the side of the cylinder head 130. In order to clarify the positional relation between the guide groove 143 and the recess 145 formed on the top face of the piston 144 and the fuel injection valve 14 and the spark plug 136 disposed in the cylinder head 130, the fuel injection valve 14, the spark plug 136, the intake valve 132, and the exhaust valve 134 are shown by thin broken lines in FIG. 2B. The recess 145 is formed at a specific position on the top face of the piston 144 to face the spark plug 136. The guide groove 143 is formed from a certain position substantially facing the fuel injection valve 14 to smoothly connect with the recess 145. FIG. 2C is an enlarged view showing the cross section of the recess 145 formed on the top face of the piston 144. As illustrated, a rim defined by a side wall of the recess 145 crossing the top face of the piston 144 partly forms a sharp edge. An up-curved portion 147 is formed along substantially half a circle at the rim of the recess 145 open to the top face of the piston 144. Namely the recess 145 is formed in a specific shape of reduced cross section at the rim open to the top face of the piston 144.

A-2. Outline of Engine Control

Figure 3:
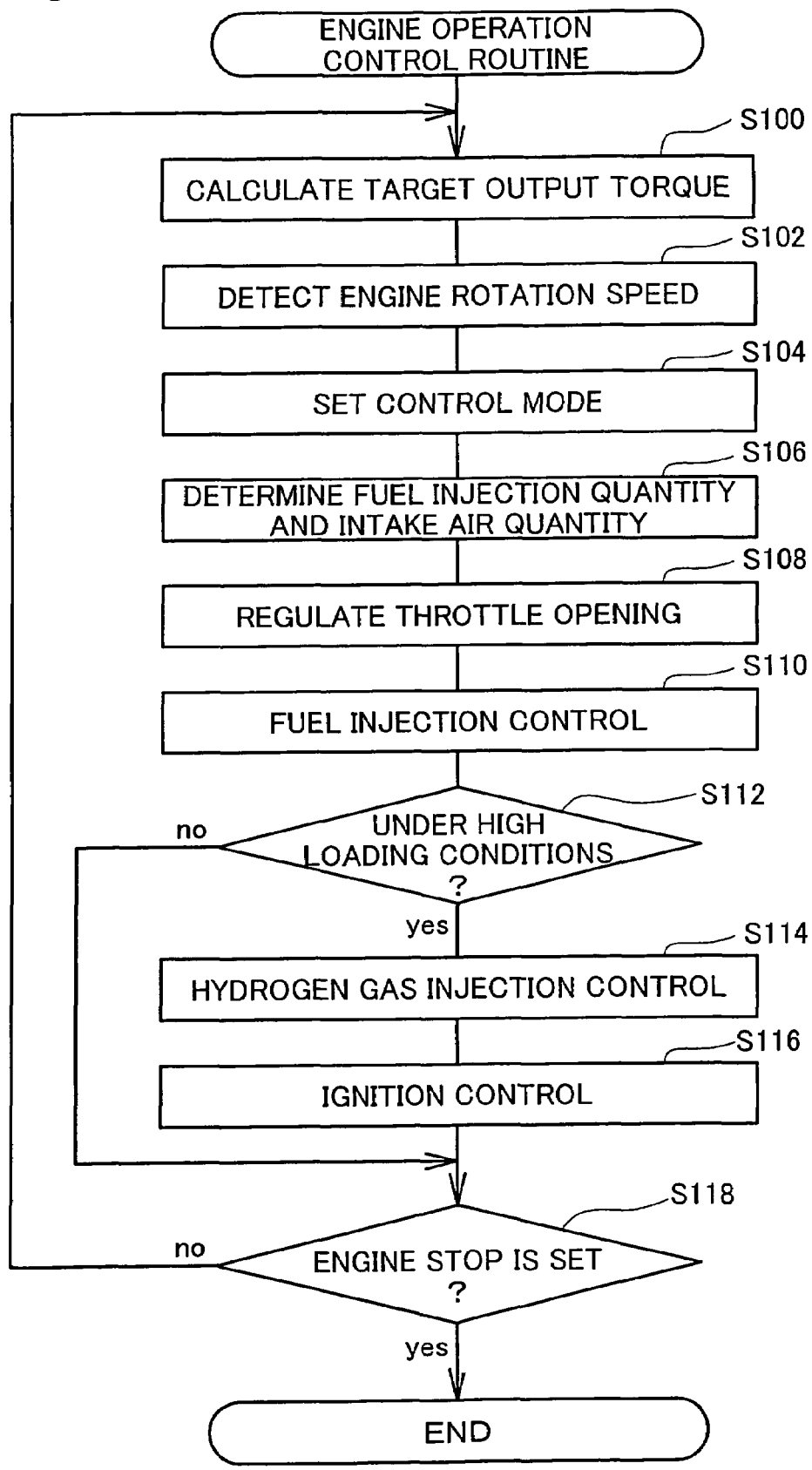
FIG. 3 is a flowchart showing an engine operation control routine executed in the engine of the first embodiment.

The engine 10 constructed as discussed above compresses and auto-ignites the air-fuel mixture in the combustion chamber to output power under control of the ECU 30. FIG. 3 is a flowchart showing an engine operation control routine executed by the ECU 30.

When the engine operation control routine starts, the ECU 30 first calculates a target output torque to be output from the engine 10 (step S100). The target output torque is calculated from the accelerator opening θac measured by the accelerator opening sensor 34. When an increase in output torque of the engine is required, the operator of the engine steps on an accelerator pedal to a greater depth. When there is no need of outputting a torque from the engine, on the other hand, the operator of the engine sets the accelerator pedal in a full closed position. It is thus thought that the operating amount of the accelerator pedal represents the level of the torque required by the operator of the engine. Based on this principle, the procedure of step S100 calculates the target output torque, which is to be output from the engine 10, from the measured accelerator opening θac.

The ECU 30 subsequently detects the engine rotation speed Ne (step S102). The engine rotation speed Ne may be computed according to the output of the crank angle sensor 32.

Figure 4:
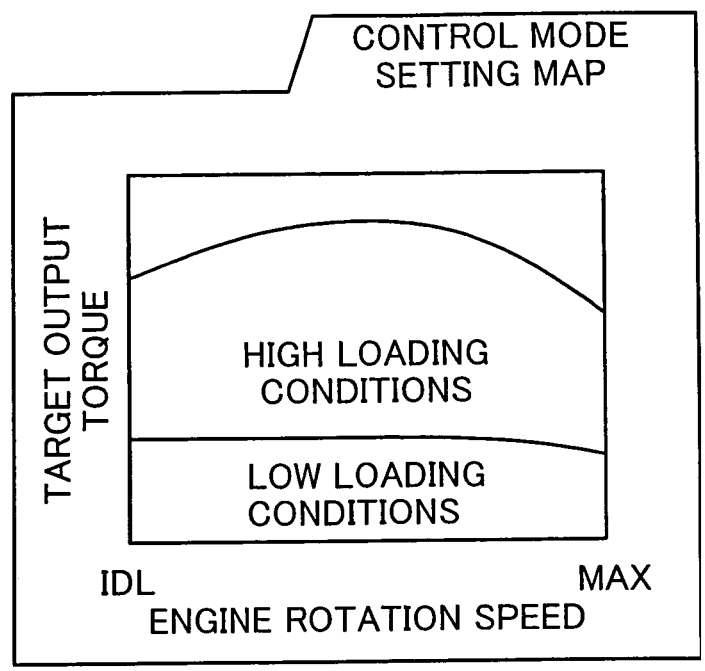
FIG. 4 conceptually shows storage of a map to specify selection of either a control mode under low loading conditions or a control mode under high loading conditions according to the combination of an engine rotation speed and a target output torque.

After calculation of the target output torque and detection of the engine rotation speed Ne, the ECU 30 sets a control mode (step S104) according to the following procedure. As mentioned previously, the engine adopting the premix compression ignition combustion system has the advantages of the less emission of the air pollutants and the less fuel consumption. The increased loading of the engine, however, still leads to the occurrence of knocking. In order to prevent such occurrence of knocking, the engine 10 of the first embodiment is constructed to inject hydrogen gas into the combustion chamber under high loading conditions of the engine 10 at a timing close to a compression top dead center and to ignite the injected hydrogen gas for auto ignition of the air-fuel mixture in the combustion chamber. This process will be discussed later in detail. The process of step S104 sets either a control mode of injecting hydrogen gas to prevent the occurrence of knocking or a standard control mode for premix compression ignition combustion, according to the load of the engine 10. In one concrete example, selection of either a control mode under low loading conditions or a control mode under high loading conditions according to the combination of the engine rotation speed and the target output torque is stored in advance in the form of a map in the internal ROM of the ECU 30. Under the low loading conditions, the standard control mode is set for premix compression ignition combustion. Under the high loading conditions, on the other hand, the control mode is set to inject hydrogen gas for prevention of the occurrence of knocking. FIG. 4 conceptually shows a map stored in the ROM of the ECU 30.

After setting the control mode, the ECU 30 determines a fuel injection quantity to be injected into the combustion chamber and an intake air quantity (step S106). The values of the fuel injection quantity and the intake air quantity are determined by referring to maps provided respectively under the low loading conditions and under the high loading conditions.

Figure 5:
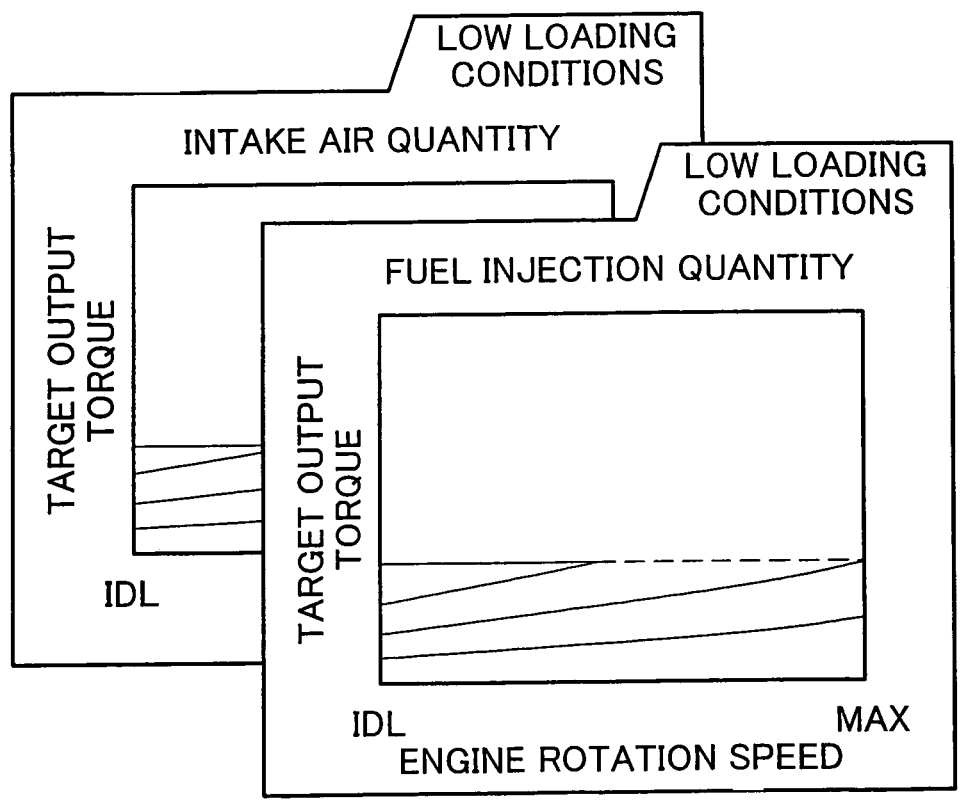
FIG. 5 conceptually shows settings of a fuel injection quantity and an intake air quantity in maps under low loading conditions.

FIG. 5 conceptually shows maps under the low loading conditions. There are two maps under the low loading conditions, that is, a map of the intake air quantity and a map of the fuel injection quantity. In the respective maps, the adequate intake air quantity and the adequate fuel injection quantity are specified according to the combination of the engine rotation speed and the target output torque.

Figure 6:
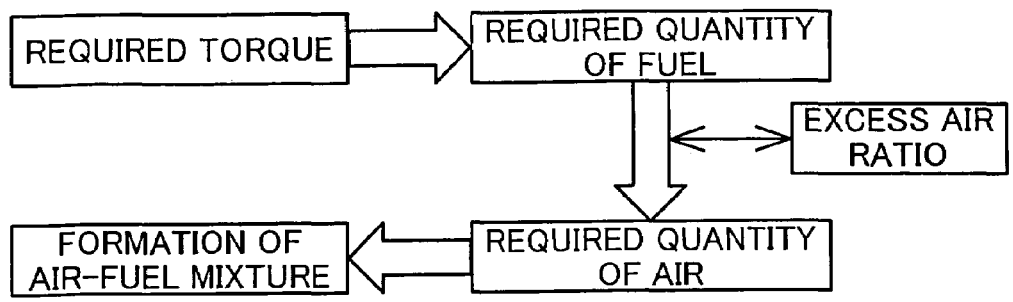
FIG. 6 is a block diagram conceptually showing a basic idea of forming an air-fuel mixture in the premix compression ignition combustion system.

The following briefly describes the basic idea for setting the intake air quantity and the fuel injection quantity as shown in FIG. 5. FIG. 6 is a block diagram conceptually showing the basic idea of forming the air-fuel mixture in the premix compression ignition combustion system. In the premix compression ignition combustion system, the procedure first sets a torque to be output from the internal combustion engine (required torque). Setting the required torque determines the required quantity of the fuel. The internal combustion engine makes the fuel subjected to combustion to raise the pressure in the combustion chamber, converts the pressure into a torque, and outputs the torque. The magnitude of the output torque is practically mapped to the quantity of the fuel. The required quantity of the fuel is thus determined according to the setting of the required torque. Determination of the required quantity of the fuel specifies the required quantity of the air. Mixing the air with the fuel at a predetermined ratio is required for compression and auto ignition of the air-fuel mixture. Determination of the required quantity of the fuel thus automatically specifies the required quantity of the air to be mixed with the fuel. Compression and auto ignition of the air-fuel mixture, which contains the determined quantity of the fuel and the specified quantity of the air, in the combustion chamber leads to output of the required torque.

On the basis of the idea shown in FIG. 6, adequate values specified by some experimental technique are set in the maps of FIG. 5. The maps under the low loading conditions are referred to in the case of small settings of the target output torque. In an area of and over a certain target output torque, clipped values are set for the values in the map of the fuel injection quantity and the values in the map of the intake air quantity. Theoretically speaking, setting the values in an area of only small target output torques is sufficient as the maps under the low loading conditions. The values in the area of higher target output torques are additionally set, in case that the area of higher target output torques is referred to during control under the low loading conditions, due to some reason. In order to prevent the occurrence of knocking, the values in this area of higher target output torques are clipped to those in the area of small target output torques.

Figure 7:
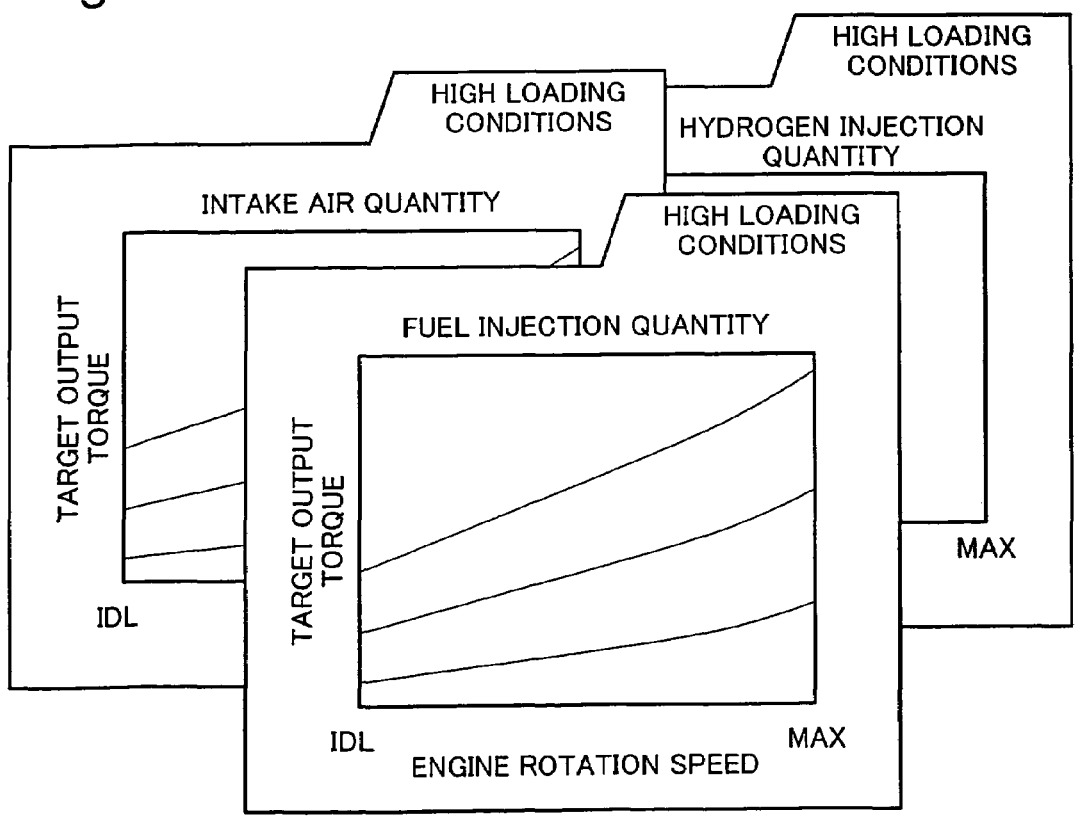
FIG. 7 conceptually shows settings of a fuel injection quantity, an intake air quantity, and a hydrogen injection quantity in maps under high loading conditions.

FIG. 7 conceptually shows maps under the high loading conditions. There are a total of three maps under the high loading conditions, that is, a map of the hydrogen injection quantity in addition to a map of the intake air quantity and a map of the fuel injection quantity. In the respective maps, the intake air quantity, the fuel injection quantity, and the hydrogen injection quantity are specified according to the combination of the engine rotation speed and the target output torque. Adequate values specified by some experimental technique are set in these maps, on the basis of the idea shown in FIG. 6.

Referring back to the flowchart of FIG. 3, the process of step S106 refers to the corresponding maps to determine the intake air quantity and the fuel injection quantity in the control mode under the low loading conditions, while determining the intake air quantity, the fuel injection quantity, and the hydrogen injection quantity in the control mode under the high loading conditions.

After determination of the intake air quantity and the fuel injection quantity (additionally the hydrogen injection quantity in the control mode under the high loading conditions), the ECU 30 regulates the opening of the throttle valve 22, in order to make the predetermined quantity of the air taken into the combustion chamber (step S108). Any of diverse known techniques may be applied to regulate the opening of the throttle valve 22. One available technique measures the quantity of intake air with an air flow sensor disposed in the intake conduit 12 and regulates the opening of the throttle valve 22 to attain a desired quantity of the intake air. Another available technique does not use the air flow sensor but measures the pressure in a section of the intake conduit 12 downstream the throttle valve 22 to calculate the quantity of intake air. A simple procedure sets the throttle opening to attain a desired quantity of intake air corresponding to the engine rotation speed in the form of a map and refers to this map to set the opening of the throttle valve 22.

The ECU 30 carries out fuel injection control subsequent to regulation of the throttle opening (step S110). The fuel injection control actuates the fuel injection valve 15, based on the fuel injection quantity determined at step S106, so as to supply a required quantity of the fuel into the combustion chamber at a desired timing in synchronism with the motion of the piston 144. The details of the fuel injection control will be discussed later with reference to the drawings.

After the fuel injection control, the ECU 30 determines whether or not the control mode currently executed is the control mode under the high loading conditions (step S112). In the case of the control mode under the high loading conditions, that is, in the case of an affirmative answer at step S112, the ECU 30 carries out control to make hydrogen gas injected from the fuel injection valve 14 into the combustion chamber at a suitable timing (step S114) and subsequently ignite the injected hydrogen gas with a spark of the spark plug 136 at an adequate timing (step S116). The details of such control will be discussed later with reference to the drawings. In the case of the control mode under the low loading conditions, that is, in the case of a negative answer at step S112, on the other hand, the ECU 30 skips the control of injecting the hydrogen gas (step S114) and igniting the injected hydrogen gas with a spark of the spark plug 136 (step S116), and makes the air-fuel mixture in the combustion chamber auto-ignited by means of only compression of the piston 144.

Combustion of the air-fuel mixture abruptly increases the pressure in the combustion chamber and produces a force of pressing the piston 144 down. The force is transmitted to the crankshaft 148 via the connecting rod 146, is converted into a torque by the crankshaft 148, and is output as a power.

The ECU 30 subsequently determines whether or not a stop of the engine 10 is set (step S118). In the case of no setting of a stop of the engine 10, the program returns to step S100 and repeats the series of processing discussed above. In the case of setting of a stop of the engine 10, on the other hand, the engine operation control routine is terminated. The engine 10 is accordingly driven according to the engine operation control routine shown in the flowchart of FIG. 3 under control of the ECU 30 and outputs the torque corresponding to the operator's setting.

A-3. Combustion Control of Air-Fuel Mixture in First Embodiment

The above engine operation control routine carries out the fuel injection control, the hydrogen gas injection control, and the ignition control, so as to make the air-fuel mixture subjected to combustion in the combustion chamber as discussed below. The engine 10 of the first embodiment performs such combustion control to attain premix compression ignition combustion of the air-fuel mixture, while preventing the occurrence of knocking even under the driving conditions of high engine load.

Figure 8A:
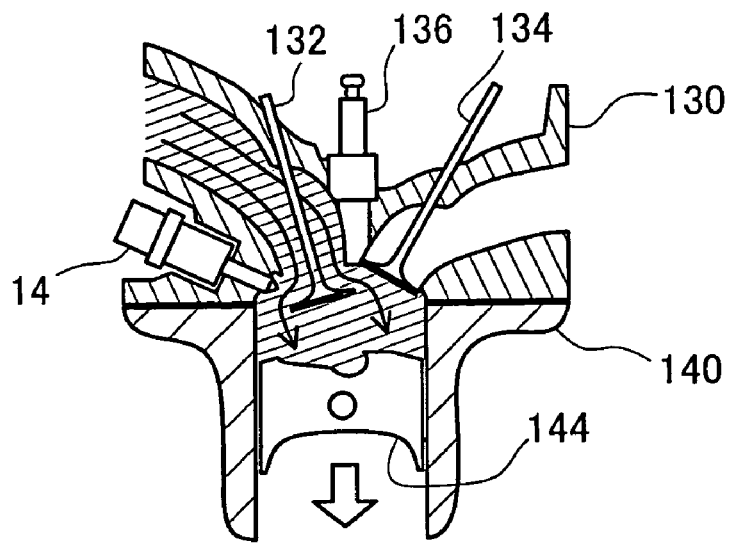
FIGS. 8A, 8B and 8C conceptually illustrate a process of compressing and auto-igniting the air-fuel mixture for combustion under the low loading conditions.
Figure 8B:
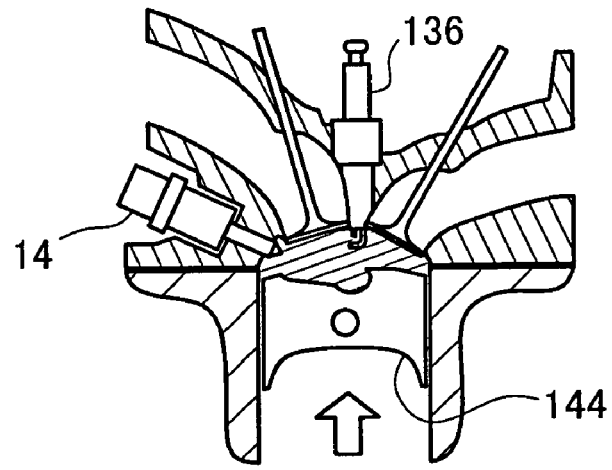
Figure 8C:
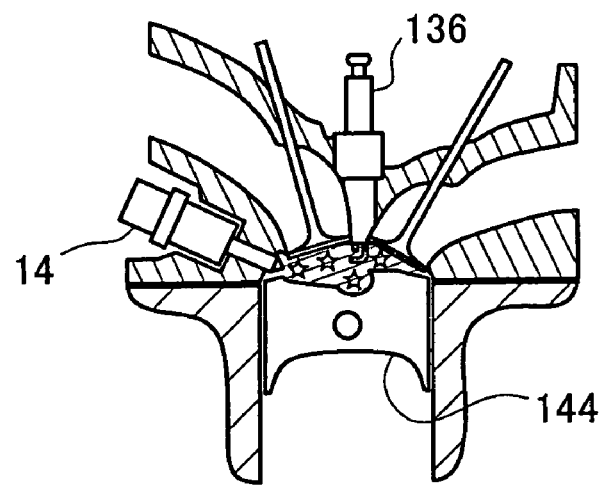

The control procedure under the low loading conditions is described with reference to FIG. 8A through 8C. FIGS. 8A, 8B and 8C conceptually illustrate a process of compressing and auto-igniting the air-fuel mixture for combustion under the low loading conditions. In the state of FIG. 8A, the air-fuel mixture is taken into the combustion chamber with a down motion of the piston 144 in an air intake cycle. The engine 10 has the fuel injection valve 15 disposed in the intake conduit 12 as mentioned previously with reference to FIG. 1. The engine operation control routine of FIG. 3 performs the control of making the fuel injected from the fuel injection valve 15 disposed in the intake conduit 12 at a preset timing at step S110. The quantity of the fuel to be injected is determined in advance at step S106, prior to the control of step S110. The timing of injecting the fuel is set as a suitable timing with elapse of some time after the closing operation of the intake valve 132 subsequent to conclusion of one air intake cycle. At this timing, the intake valve 132 is in the closed position, so that the fuel injected into the intake conduit 12 is vaporized and is mixed with the air in the intake conduit 12. At the start of a next air intake cycle, the mixture of the vaporized fuel and the air is taken as the air-fuel mixture into the combustion chamber. In the state of FIG. 8A, the air-fuel mixture is flown from the intake conduit 12 into the combustion chamber.

When the piston 144 reaches its lowest possible position, the intake valve 132 is closed to lift the piston 144 up and compress the air-fuel mixture. The lowest possible position of the piston 144 is generally referred to as the bottom dead center. In the state of FIG. 8B, the piston 144 is lifted up to compress the air-fuel mixture. Compression of the air-fuel mixture increases the internal pressure and gradually raises the temperature. The temperature reaches the ignition point of the air-fuel mixture and causes practically simultaneous auto ignition of the whole air-fuel mixture, as the piston 144 approaches to its highest possible position. The highest possible position of the piston 144 is generally referred to as the top dead center. In the state of FIG. 8C, the whole air-fuel mixture is substantially simultaneously auto-ignited in the combustion chamber, as the piston 144 is close to the top dead center. As described later in detail, the premix compression ignition combustion system auto-ignites the air-fuel mixture in the combustion chamber in this manner to cause a practically simultaneous start of combustion of the air-fuel mixture, thereby significantly and simultaneously reducing the emission of the air pollutants and the fuel consumption.

The premix compression ignition combustion system causes practically simultaneous auto ignition and combustion of the whole air-fuel mixture in the combustion chamber. The high loading of the engine 10 (to output a large torque) thus leads to the occurrence of severe knocking. The increased quantities of the fuel and the air taken into the combustion chamber to output a large torque heighten the internal pressure of the combustion chamber at the time of conclusion of the air intake cycle. The action of closing the intake valve 132 to lift the piston 144 up in this state starts compression of the air-fuel mixture under the high pressure. The pressure and the temperature of the air-fuel mixture thus increase more quickly, compared with those under the conditions of the low loading of the engine 10. This leads to auto ignition of the air-fuel mixture in a subsequent compression cycle to cause sever knocking. The engine 10 carries out a specific control under the high loading conditions as discussed below, in order to attain the smooth premix compression ignition combustion without causing any severe knocking.

Figure 9A:
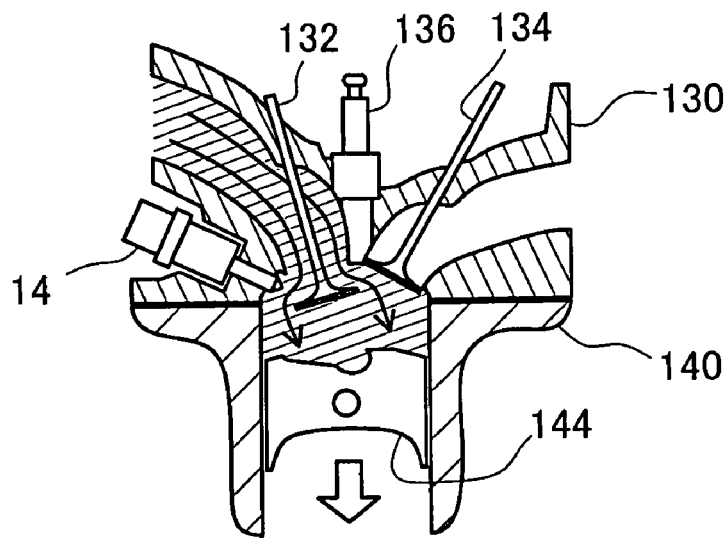
FIGS. 9A, 9B and 9C conceptually illustrate a process of compressing and auto-igniting the air-fuel mixture for combustion under the high loading conditions.
Figure 9B:
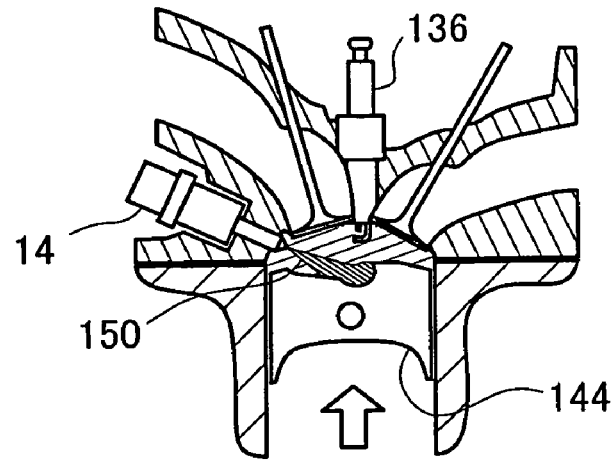
Figure 9C:
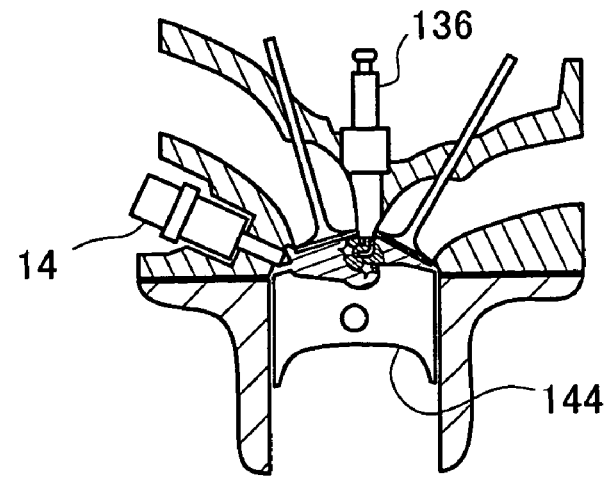

FIG. 9A through 9C conceptually illustrate a process of compressing and auto-igniting the air-fuel mixture for combustion under the high loading conditions. In the state of FIG. 9A, the air-fuel mixture is taken into the combustion chamber with a down motion of the piston 144 in an air intake cycle. The operations in the air intake cycle under the high loading conditions are substantially similar to those under the low loading conditions discussed above. Under the high loading conditions, however, a large value is set to the excess air ratio of the air-fuel mixture, in order to prevent the occurrence of knocking. Setting a large value to the excess air ratio of the air-fuel mixture suppresses auto ignition of the air-fuel mixture, thus preventing auto ignition of the air-fuel mixture in the course of an up motion of the piston 144.

Here the excess air ratio is an index representing the ratio of the fuel to the air included in the air-fuel mixture. The air fuel ratio widely used as another index representing the ratio of the fuel to the air included in the air-fuel mixture expresses the ratio of the fuel to the air as the weight ratio of the air to the fuel. The excess air ratio, on the other hand, expresses the ratio of the fuel to the air relative to a reference rate of the fuel to the air attaining just enough combustion. The excess air ratio of a value '1' means that the fuel and the air are included in the air-fuel mixture at the reference rate of the fuel to the air attaining just enough combustion. The excess air ratio of a value '2' means that the ratio of the air included in the air-fuel mixture is double the required rate of the air attaining just enough combustion of the fuel.

As the piston 144 moves down, the air-fuel mixture is taken into the combustion chamber. When the piston 144 reaches its lowest possible position, the intake valve 132 is closed to lift the piston 144 up and compress the air-fuel mixture. As mentioned previously, a greater value is set to the excess air ratio of the air-fuel mixture under the high loading conditions, compared with the setting of the excess air ratio under the low loading conditions. This arrangement effectively prevents auto ignition of the air-fuel mixture in the compression cycle even under the high loading conditions.

The procedure then makes hydrogen gas injected from the fuel injection valve 14 into the combustion chamber at a suitable timing when the piston 144 is close to the top dead center in the compression cycle. In the state of FIG. 9B, hydrogen gas is injected from the fuel injection valve 14 immediately before the piston 144 reaches the top dead center. As described previously with reference to FIG. 2A through 2C, the guide groove 143 and the recess 145 are formed on the top face of the piston 144, and the hydrogen gas injected from the fuel injection valve 14 is guided along the guide groove 143 and is flown into the recess 145. The up-curved portion 147 is formed along substantially half the circle at the far end of the rim of the recess 145 seen from the guide groove 143. The flow of hydrogen gas entering the recess 145 is blocked off by the up-curved portion 147 and does not readily ride over the rim. The injected hydrogen gas is thus effectively kept in the vicinity of the recess 145 to form a mixture of hydrogen, gasoline, and the air.

After injection of the hydrogen gas into the combustion chamber, the hydrogen-air mixture is ignited with a spark of the spark plug 136. In the state of FIG. 9C, the hydrogen-air mixture is ignited at a timing when the piston 144 is close to the top dead center in the compression cycle. Ignition of the hydrogen-air mixture with a spark of the spark plug 136 leads to quick combustion of the hydrogen-air mixture to raise the internal pressure of the combustion chamber. The gasoline-air mixture formed in the combustion chamber is accordingly compressed and auto-ignited to start combustion substantially all at once.

Figure 10:
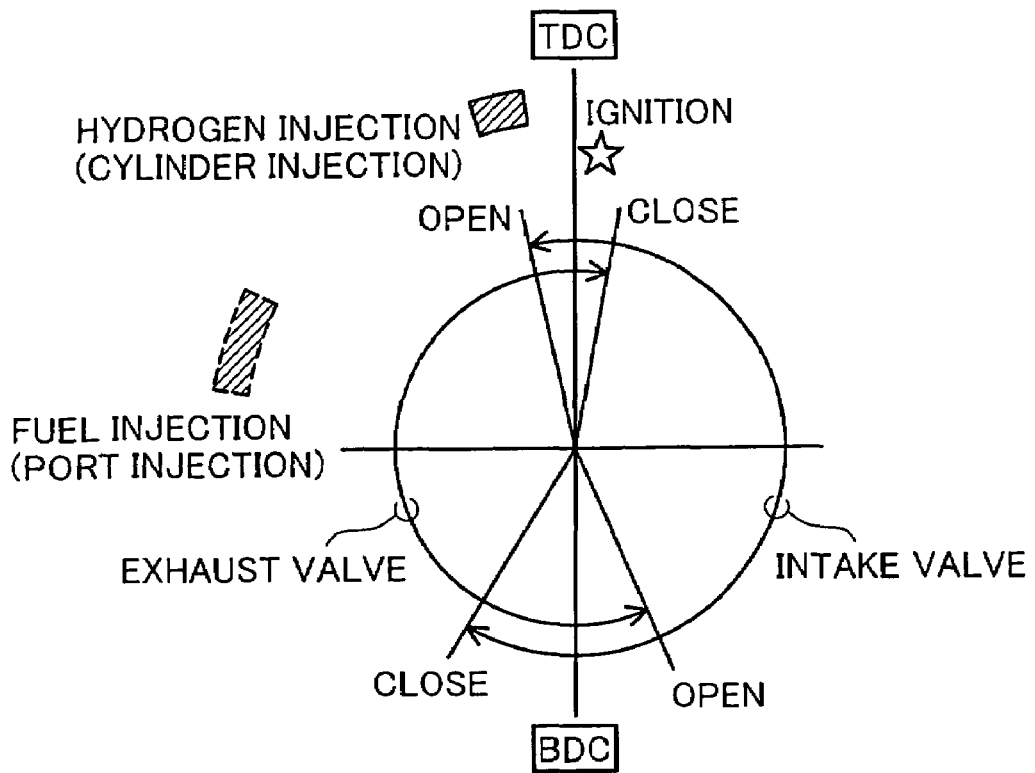
FIG. 10 shows an injection timing of a fuel and an ignition timing relative to open and close timings of an intake valve and an exhaust valve under the high loading conditions.

FIG. 10 shows the injection timing of the fuel from the fuel injection valve 15, the injection timing of the hydrogen gas from the fuel injection valve 14, and the ignition timing of the injected hydrogen gas with a spark of the spark plug 136 relative to the open and close timings of the intake valve 132 and the exhaust valve 134 under the high loading conditions. In the drawing, TDC represents a timing at which the piston reaches the top dead center, and BDC represents a timing at which the piston reaches the bottom dead center. The intake valve 132 is opened at a timing slightly before the piston 144 reaches the top dead center, and is closed at a timing slightly after the piston 144 reaches the bottom dead center. The arrangement of opening the intake valve 132 at a timing slightly earlier than the top dead center of the piston 144 and closing the intake valve 132 at a timing slightly later than the bottom dead center ensures intake of a sufficient quantity of the air even under the conditions of the high engine rotation speed. The exhaust valve 134 is, on the other hand, opened at a timing slightly before the piston 144 reaches the bottom dead center, and is closed at a timing slightly after the piston 144 reaches the top dead center. The arrangement of opening the exhaust valve 134 at a timing slightly earlier than the bottom dead center of the piston 144 and closing the exhaust valve 134 at a timing slightly later than the top dead center ensures effective discharge of the exhaust gas from the combustion chamber, even when it is required to discharge a large amount of the exhaust gas within a short time period, for example, in the case of the high engine load and the high engine rotation speed.

The injection timing of gasoline is shown by a hatched area defined by the broken line in FIG. 10. The injection timing of gasoline from the fuel injection valve 15 into the intake conduit 12 is set as an adequate timing in a range between 90 degrees prior to the top dead center in the compression cycle and the top dead center after the closing operation of the intake valve 132. As mentioned previously, the gasoline injected at this timing is vaporized and is mixed with the air in the intake conduit 12 and is taken into the combustion chamber in a next air intake cycle (see FIG. 9A).

After intake of the gasoline-air mixture, the procedure lifts the piston 144 up to compress the gasoline-air mixture and makes hydrogen gas injected from the fuel injection valve 14 into the combustion chamber at a timing slightly before the piston 144 reaches the top dead center (more specifically, at an adequate timing set in a range between 30 degrees prior to the top dead center in the compression cycle and the top dead center). The injection timing of hydrogen gas is shown by a hatched area defined by the solid line in FIG. 10. The arrangement of making the hydrogen gas injected from the fuel injection valve 14 at a timing slightly earlier than the top dead center of the piston 144 causes the injected hydrogen gas to be mixed with the gasoline-air mixture in the combustion chamber and to be guided along the guide groove 143 formed on the top face of the piston 144, so as to be collected in the vicinity of the recess 145 (see FIG. 9B). The hydrogen-air mixture collected in the vicinity of the recess 145 is ignited with a spark of the spark plug 136 at a timing immediately after the piston 144 reaches the top dead center in the compression cycle. The open star shown in FIG. 10 represents a timing of ignition with a spark of the spark plug 136. The ignited hydrogen-air mixture is quickly combusted to compress the surrounding air-fuel mixture and cause substantially simultaneous auto ignition of the whole air-fuel mixture in the combustion chamber. This process is described below with reference to FIG. 11.

Figure 11:
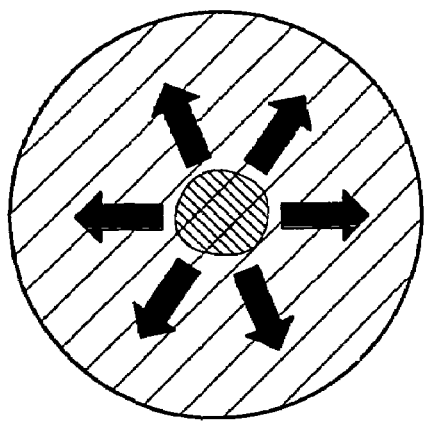
FIG. 11 conceptually shows formation of a gasoline-air mixture and a hydrogen-air mixture in the combustion chamber.

FIG. 11 conceptually shows formation of the gasoline-air mixture and the hydrogen-air mixture in the combustion chamber. A rough hatched area represents an area of the gasoline-air mixture, while a fine hatched area represents an area of the hydrogen-air mixture. As described previously, the hydrogen gas is injected in the presence of the gasoline-air mixture. The excess air ratio of the hydrogen-air mixture is accordingly smaller than the excess air ratio of the gasoline-air mixture. Namely the hydrogen-air mixture has the higher ratio of the fuel to the air than the gasoline-air mixture. When the hydrogen-air mixture is ignited, the hydrogen-air mixture expressed by the fine hatched area is quickly combusted to compress the surrounding gasoline-air mixture. The closed arrows radially extending from the fine hatched area representing the hydrogen-air mixture in FIG. 11 conceptually show the process of combusting the hydrogen-air mixture to compress the surrounding gasoline-air mixture.

Figure 12:
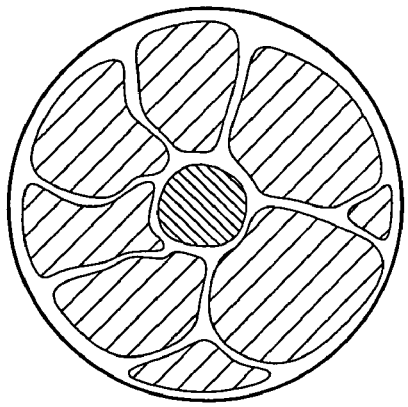
FIG. 12 conceptually shows a process of compressing and auto-igniting the gasoline-air mixture through combustion of the hydrogen-air mixture.

As described above, a large value is set to the excess air ratio of the gasoline-air mixture under the conditions of the high engine load. The gasoline-air mixture is not auto-ignited through simple compression by means of the piston 144. The gasoline-air mixture is further compressed with combustion of the hydrogen-air mixture as shown in FIG. 11 and is eventually auto-ignited. FIG. 12 conceptually shows auto ignition of the gasoline-air mixture. Combustion of the hydrogen-air mixture raises the internal pressure of the whole combustion chamber. This uniformly compresses the gasoline-air mixture and makes the whole gasoline-air mixture auto-ignited substantially simultaneously. Strictly speaking, non-uniformity of the excess air ratio over the whole gasoline-air mixture or a slightly lower temperature in the vicinity of the wall surface of the combustion chamber prevents the whole gasoline-air mixture from being auto-ignited at a completely identical timing. A fine hatched area in FIG. 12 represents a combustion area of the hydrogen-air mixture. Rough hatched areas surrounding the fine hatched area conceptually show that the surrounding gasoline-air mixture is auto-ignited substantially simultaneously by combustion of the hydrogen-air mixture.

As described above, under the conditions of the high engine load, a sufficiently large value, which prevents auto ignition of the air-fuel mixture through simple compression by means of the piston 144, is set to the excess air ratio of the air-fuel mixture taken into the combustion chamber in the air intake cycle. This arrangement effectively prevents the air-fuel mixture from being auto-ignited in the compression cycle even under the high loading conditions and thus securely avoids the occurrence of knocking. Injection of the hydrogen gas for combustion in the vicinity of the top dead center in the compression cycle leads to further compression and auto ignition of the gasoline-air mixture, which has not been auto-ignited through simple compression by means of the piston 144. Regulating the ignition timing of the hydrogen-air mixture thus allows for auto ignition of the gasoline-air mixture at a desired timing.

The engine 10 of the embodiment enables the air-fuel mixture to be compressed and auto-ignited under the high loading conditions as well as under the low loading conditions. Adoption of the premix compression ignition combustion system significantly reduces the emission of the air pollutants from the internal combustion engine and the fuel consumption of the internal combustion engine. The engine 10 of the embodiment allows the air-fuel mixture to be compressed and auto-ignited, regardless of the engine loading level. This arrangement ensures more effective reduction of the emission of the air pollutants and the fuel consumption. The reason why the premix compression ignition combustion system simultaneously and significantly reduces the emission of the air pollutants and the fuel consumption will be described later briefly.

The engine 10 of the embodiment ignites the hydrogen-air mixture to trigger auto ignition of the gasoline-air mixture under the high loading conditions. The use of the hydrogen gas to be mixed with the air and to be ignited has various advantages as discussed below.

Hydrogen gas has a higher octane value (lower potential of auto ignition) than gasoline. The hydrogen gas injected into the air-fuel mixture at high temperatures in the vicinity of the top dead center in the compression cycle is thus not readily auto-ignited. The combustion start timing of the hydrogen-air mixture is thus substantially equal to the ignition timing of the hydrogen-air mixture with a spark of the spark plug 136. This ensures effective control of the timing of compressing and auto-igniting the gasoline-air mixture.

Another characteristic is that the hydrogen-air mixture has a wider ignition range than the gasoline-air mixture. In general, the air-fuel mixture is not combustible when the ratio of the fuel to the air is too low (that is, in the case of an extremely large excess air ratio) or inversely when the ratio of the fuel to the air is too high (that is, in the case of an extremely small excess air ratio). In order to attain ignition of the air-fuel mixture with a spark of the spark plug, the excess air ratio of the air-fuel mixture is to be in an ignitable range. For example, immediately after injection of the fuel, the air-fuel mixture has an extremely small excess air ratio and is thus not ignitable. In the case where the injected fuel is not effectively collected in the vicinity of the spark plug, for example, due to a flow of the air in the combustion chamber, the air-fuel mixture has an extremely large excess air ratio and is thus not ignitable. Hydrogen gas has a wider ignitable range of the excess air ratio than gasoline. The hydrogen-air mixture is thus effectively ignitable with a spark of the spark plug, even when only a little time has elapsed after injection of the fuel or even when the injected fuel is not effectively collected in the vicinity of the spark plug. The use of the hydrogen gas thus ensures reliable auto ignition of the gasoline-air mixture at a desired timing.

Still another characteristic is that the hydrogen-air mixture has a shorter ignition delay time than the gasoline-air mixture. Here the ignition delay time represents a phenomenon observed in the process of igniting the air-fuel mixture. The air-fuel mixture is ignited with a spark according to the following procedure. Emission of a spark from the spark plug into the air-fuel mixture forms a fire genesis called a flame nucleus. A highly active intermediate product is produced inside the flame nucleus. This intermediate product further reacts with the molecules of the fuel and newly produces the intermediate product. As the intermediate product is accumulated to a certain level in the flame nucleus, an exothermic reaction starts to form the flame and make the flame spread over the surrounding air-fuel mixture. There is a time delay or time difference between emission of a spark into the air-fuel mixture and actual spread of the flame over the surrounding air-fuel mixture. This time delay is called the ignition delay time. The ignition delay time depends upon the easiness of accumulation of the intermediate product and is thus varied among different fuels. Even an identical fuel-air mixture has a variation in ignition delay time, due to a slight difference of the conditions.

Hydrogen gas has a significantly shorter ignition delay time than gasoline and makes the flame spread over the surrounding air-fuel mixture immediately after emission of a spark. Such a significantly short ignition delay time gives extremely little variation in start timing of spreading the flame over the surrounding air-fuel mixture after emission of a spark from the spark plug 136. The use of the hydrogen gas to be mixed with the air and ignited with a spark of the spark plug 136 ensures accurate control of the timing of auto ignition of the gasoline-air mixture.

Because of the wide ignition range of the hydrogen gas, the timing of injecting the hydrogen gas into the combustion chamber is set immediately before the top dead center in the compression cycle as described previously with reference to FIG. 10. The hydrogen gas is ignitable even immediately after injection, when the hydrogen gas is not sufficiently diffused into the air-fuel mixture. The injection timing can thus be delayed to the timing immediately before ignition. Delay of the injection timing shortens the diffusion time of the injected hydrogen gas and thus advantageously keeps the hydrogen-air mixture in the vicinity of the spark plug 136. Auto ignition of the air-fuel mixture depends upon the heat history applied to the air-fuel mixture. The delayed injection timing of the hydrogen gas shortens the time of making the hydrogen-air mixture exposed to high temperatures and thus more effectively prevents auto ignition of the hydrogen-air mixture.

Because of the short ignition delay time of the hydrogen gas, the timing of emitting a spark from the spark plug 136 is set immediately after the top dead center in the compression cycle as described previously with reference to FIG. 10. Emission of a spark immediately ignites the hydrogen gas and makes the flame spread over the surrounding gasoline-air mixture. The ignition timing is thus set immediately before a desired timing of compressing and auto-igniting the gasoline-air mixture.

As clearly understood from the above description, when a fuel having a high octane value, such as methane gas, ethane gas, propane gas, or natural gas, or an alcohol like methanol, is used as the fuel to be mixed with the air and ignited with a spark, the fuel injection timing and the ignition timing should be set adequately according to the properties of the fuel. For example, any of the high octane-value fuels like methane gas, ethane gas, and the alcohols like methanol has a narrower combustible range than the hydrogen gas, and thereby requires a longer time to make the excess air ratio of the air-fuel mixture reach an ignitable level after injection of the fuel. The timing of injecting such a fuel is thus set earlier than the timing of injecting the hydrogen gas. For example, any of the alcohols is injected at an adequate timing in a range between 90 degrees prior to the top dead center in the compression cycle and 30 degrees prior to the top dead center in the compression cycle. These alternative fuels have longer ignition delay times than the hydrogen gas, so that the ignition timing of any of the alternative fuels is set earlier than the ignition timing of the hydrogen gas.

A fuel storage tank for storing the fuel is required to allow for injection of the hydrogen gas or any of the high octane-value fuels like methane gas, ethane gas, and alcohols. The engine 10 of the first embodiment has the hydrogen storage tank 170 for storing pressurized hydrogen gas as shown in FIG. 1. The mixture of the air and such a fuel is combusted in the vicinity of the top dead center in the compression cycle, where the volume in the compression chamber is minimized. Combustion of even a small quantity of the fuel thus effectively heightens the internal pressure of the combustion chamber. For example, in the case of the hydrogen gas, the required quantity of each injection is as small as 0.1 to 0.5 mg. In the case of an alternative high octane-value fuel other than the hydrogen gas, each injection requires only a small quantity, because of the same reason. The fuel storage tank, such as the hydrogen storage tank 170, which is arranged separately from the gasoline tank, has a small required volume.

Figure 13:
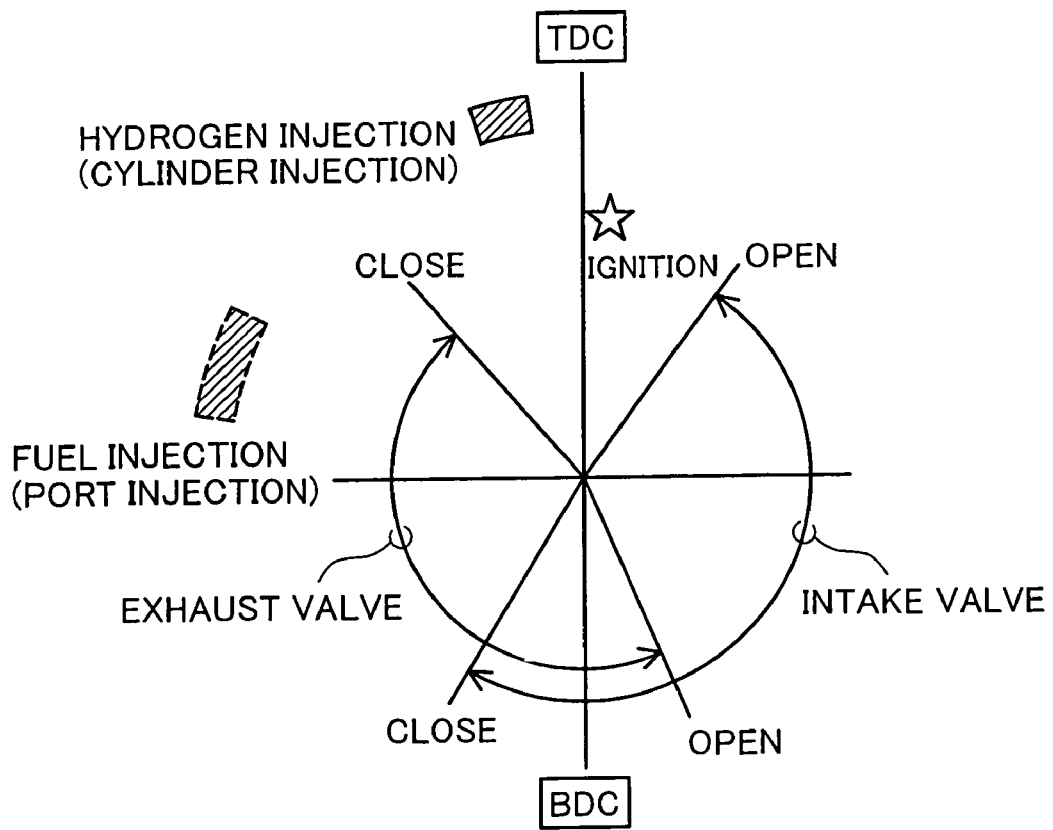
FIG. 13 shows different settings of the open and close timings of the intake valve and the exhaust valve.

In the above description, the timing of closing the exhaust valve 134 is set slightly after the piston 144 reaches its top dead center as shown in FIG. 10. This allows for complete discharge of the exhaust gas from the combustion chamber. The timing of opening the intake valve 132 is set slightly before the piston 144 reaches the top dead center. This ensures sufficient intake of the air. In the engine of the premix compression ignition combustion system that compresses and auto-ignites the air-fuel mixture, timings shown in FIG. 13 may be set to the timing of closing the exhaust valve 134 and the timing of opening the intake valve 132. In this modified structure, the timing of closing the exhaust valve 134 is set slightly before the piston 144 reaches the top dead center. The exhaust valve 134 is accordingly closed, while the piston 144 discharges the exhaust gas from the combustion chamber. A large quantity of the exhaust gas thus remains in the combustion chamber. The piston 144 moves up, while compressing the remaining exhaust gas. The timing of opening the intake valve 132 is set slightly after the piston 144 exceeds the top dead center. In this modified structure, the intake valve 132 is opened, when the piston 144 moves down a little from the top dead center to slightly decrease the internal pressure of the combustion chamber. The exhaust gas compressed in the combustion chamber is thus not inversely flown into the intake conduit 12, but the air is flown into the combustion chamber with the down motion of the piston 144.

As described above, setting the timings shown in FIG. 13 to the timing of closing the exhaust valve 134 and the timing of opening the intake valve 132 causes a large quantity of the exhaust gas to be left in the combustion chamber. The exhaust gas remaining in the combustion chamber has the higher temperature than the intake air, so that the air-fuel mixture has the high temperature even prior to compression. The exhaust gas includes a large quantity of the active intermediate product produced through combustion. In combination with the high temperature of the air-fuel mixture prior to compression, the presence of the active intermediate product facilitates auto ignition of the air-fuel mixture. Even when a relatively low value is set to the compression rate of the engine 10, this modified structure ensures the smooth premix compression ignition combustion.

As described above, the engine 10 of the first embodiment causes the hydrogen-air mixture to be ignited with a spark of the spark plug 136 under the high loading conditions, thereby preventing the occurrence of knocking. The too early ignition timing with the spark plug 136 due to some reason may, however, possibly cause knocking. In such cases, the occurrence of knocking is detected with the knocking sensor 25 disposed in the cylinder block 140 to make a lag of the ignition timing. The lag of the ignition timing effectively prevents the occurrence of severe knocking. The occurrence of knocking may be detected with the pressure sensor 23, instead of the knocking sensor 25. As the knocking occurs, the pressure abruptly rises in the combustion chamber. The occurrence of knocking may thus be detected, based on the increase rate of the pressure computed from the output of the pressure sensor 23.

The too early ignition timing increases the concentration of nitrogen oxides included in the exhaust gas. One preferable procedure thus measures the concentration of nitrogen oxides included in the exhaust gas, based on the output of the NOx sensor 21 disposed in the exhaust conduit 16, and makes a lag of the ignition timing with the spark plug 136 when the measured concentration exceeds a predetermined threshold value. Delay of the ignition timing to an adequate time effectively reduces the concentration of nitrogen oxides included in the exhaust gas.

The engine 10 of the first embodiment changes the injection timing of the fuel injection valve 14, in combination with the change of the ignition timing, so as to prevent a significant variation in time between injection of the hydrogen gas and ignition of the hydrogen-air mixture with a spark of the spark plug 136. The hydrogen-air mixture of an adequate concentration is thus present in the vicinity of the spark plug 136, regardless of the variation in ignition timing. This ensures effective ignition of the hydrogen-air mixture with a spark of the spark plug 136.

The engine 10 of the first embodiment adopts the premix compression ignition combustion system to simultaneously and significantly reduce the emission of the air pollutants and the fuel consumption. The reason of such reduction is described briefly.

Such excellent characteristics of the premix compression ignition combustion system may be ascribed to three factors, 'increased isovolume level', 'increased excess air ratio', and 'increased specific heat'. The first factor 'increased isovolume level' is described first. According to the cycle theory of the internal combustion engine, the gasoline engine has a maximum efficiency in the case of momentary combustion (that is, combustion in an infinitely small time) of all the air-fuel mixture in the combustion chamber at a timing when the piston reaches the top dead center in the compression cycle. In the actual state, momentary combustion of all the air-fuel mixture in the combustion chamber is impractical. Combustion of all the air-fuel mixture in the combustion chamber within a shorter time period more effectively improves the efficiency of the engine. The isovolume level is regarded as an index showing how little time is required to complete combustion of all the air-fuel mixture. The higher isovolume level represents the higher efficiency of the engine.

In the premix compression ignition combustion system, compression and auto ignition of the air-fuel mixture practically simultaneously starts combustion of the whole air-fuel mixture in the combustion chamber. This results in practically simultaneous conclusion of combustion of the whole air-fuel mixture and significantly improves the isovolume level. The improved isovolume level enhances the efficiency of the engine and thus remarkably reduces the fuel consumption.

The second factor 'increased excess air ratio' of the excellent characteristics of the premix compression ignition combustion system is described below. The premix compression ignition combustion system makes the air-fuel mixture having a large excess air ratio subjected to combustion. Combustion of such air-fuel mixture reduces the emission of the air pollutants by two mechanisms. One mechanism is a lowered combustion rate. Here the combustion rate represents a rate of combustion reaction. The isovolume level is an index relating to the time required for combustion of all the air-fuel mixture in the combustion chamber. For example, in the case where combustion of the air-fuel mixture successively starts from one end of the combustion chamber, even under the condition of a high rate of the combustion reaction, it takes a long time to complete combustion of the whole air-fuel mixture and the isovolume level is lowered. Namely the combustion rate of the air-fuel mixture is to be clearly discriminated from the time required for combustion of all the air-fuel mixture in the combustion chamber.

In general, the combustion rate of the air-fuel mixture strongly depends upon the excess air ratio. The combustion rate reaches its maximum at the excess air ratio of approximately 1 and decreases with an increase in excess air ratio. As mentioned previously, the premix compression ignition combustion system combusts the air-fuel mixture having a large excess air ratio and thereby lowers the combustion rate. The lowered combustion rate reduces the emission of nitrogen oxides as air pollutants, because of the reason discussed below.

It is assumed that most of the nitrogen oxides included in the exhaust gas are produced by a reaction of nitrogen molecules and oxygen molecules included in the air under the effects of heat by combustion. The nitrogen molecules are stable and react with oxygen to produce nitrogen oxides only when being exposed to significantly high temperatures. In the case of a low combustion rate to cause slow combustion of the air-fuel mixture, most of the heat produced by the combustion is transmitted to the surroundings, while the remaining heat raises the temperature of the air-fuel mixture under combustion. A fine flow called 'turbulence' remains especially in the air-fuel mixture formed in the combustion chamber of the engine, and the heat of combustion is diffused to the surroundings by the effects of the turbulence. In the case of a high combustion rate, on the other hand, combustion is completed before the heat produced by the combustion is diffused to the surroundings. The air-fuel mixture under combustion accordingly has extremely high temperatures. The air contains a large number of nitrogen molecules. Exposure of the nitrogen molecules to the high temperatures even in a very short time thus makes the nitrogen molecules react with oxygen to produce nitrogen oxides. When the temperature does not reach the sufficiently high level of making the nitrogen molecules react with oxygen, little or substantially no nitrogen oxides are produced.

The premix compression ignition combustion system combusts the air-fuel mixture having a large excess air ratio and thereby lowers the combustion rate. The lowered combustion rate allows for combustion of the air-fuel mixture with little emission of nitrogen oxides, because of the reasons discussed above.

The premix compression ignition combustion system combusts the air-fuel mixture having a large excess air ratio and thus significantly reduces the emission of air pollutants, such as carbon monoxide and hydrocarbons, according to the mechanism discussed below.

The air pollutants like carbon monoxide and hydrocarbons are produced in the absence of a sufficient quantity of oxygen to the fuel, which causes an insufficient reaction of the fuel with oxygen. The premix compression ignition combustion system combusts the air-fuel mixture having a large excess air ratio and thus ensures combustion of the air-fuel mixture in the presence of a sufficient quantity of oxygen to the fuel. This significantly reduces the emission of carbon monoxide and hydrocarbons.

The third factor 'increased specific heat' of the excellent characteristics of the premix compression ignition combustion system is described here. This factor is also closely related to combustion of the air-fuel mixture having a large excess air ratio. In the case of combustion of the air-fuel mixture having a smaller excess air ratio than '1', there is no sufficient quantity of oxygen to the fuel. The fuel is thus not completely oxidized to carbon dioxide and water, but the reaction stops in the state where the fuel is converted into carbon monoxide and hydrogen. Even when the whole air-fuel mixture has an excess air ratio of greater than '1', some variation in concentration of the fuel locally causes areas of insufficient oxygen. In such areas, carbon monoxide and hydrogen are produced. The premix compression ignition combustion system, on the other hand, combusts the air-fuel mixture having a sufficiently large excess air ratio and thus ensures complete oxidation of the fuel into carbon dioxide and steam.

Carbon dioxide and steam (water) are three-atom molecules consisting of three atoms, whereas carbon monoxide and hydrogen molecule are two-atom molecules consisting of two atoms. According to the teachings of statistical thermodynamics, the three-atom molecule has a greater specific heat than the two-atom molecule. Raising the temperature of the three-atom molecule is than harder than raising the temperature of the two-atom molecule. The premix compression ignition combustion system combusts the air-fuel mixture having a large excess air ratio and gives a higher specific heat with a higher rate of the three-atom molecules, that is, carbon dioxide and steam. This effectively lowers the combustion temperature and significantly reduces the emission of nitrogen oxides.

The engine 10 of the embodiment premixes, compresses, and auto-ignites the air-fuel mixture for combustion, regardless of the loading level of the engine 10. This arrangement simultaneously and significantly reduces the emission of the air pollutants and the fuel consumption, because of the reasons described above.

A-4. Modifications

There are various modifications of the first embodiment discussed above. Some of the possible modifications are given below.

(a) First Modified Example

Figure 14A:
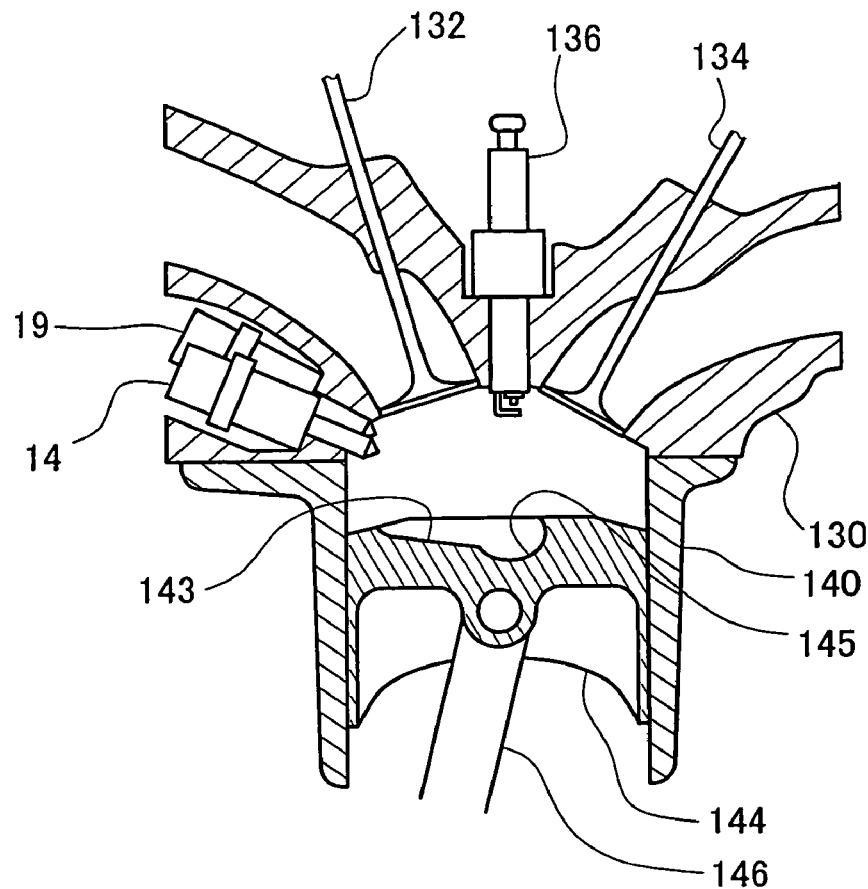
FIGS. 14A and 14B illustrate the structure of a combustion chamber in an engine of a first modified example of the first embodiment.
Figure 14B:
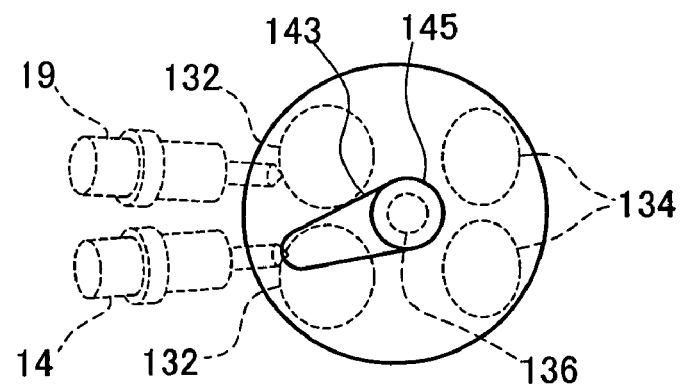

FIGS. 14A and 14B illustrate the structure of a combustion chamber in another engine in a first modified example of the first embodiment. FIG. 14A is a sectional view of the combustion chamber, and FIG. 14B is a top view showing the top face of the piston 144 seen from the cylinder head 130. In the structure of the first embodiment described above, the fuel injection valve 15 for injection of gasoline is disposed in the intake conduit 12, and the fuel injection valve 14 for injection of hydrogen gas is disposed in the combustion chamber. In the structure of the first modified example, on the other hand, a fuel injection valve 19 for injection of gasoline and the fuel injection valve 14 for injection of hydrogen gas are disposed in the combustion chamber. Both gasoline and hydrogen gas are thus directly injected into the combustion chamber.

Figure 15A:
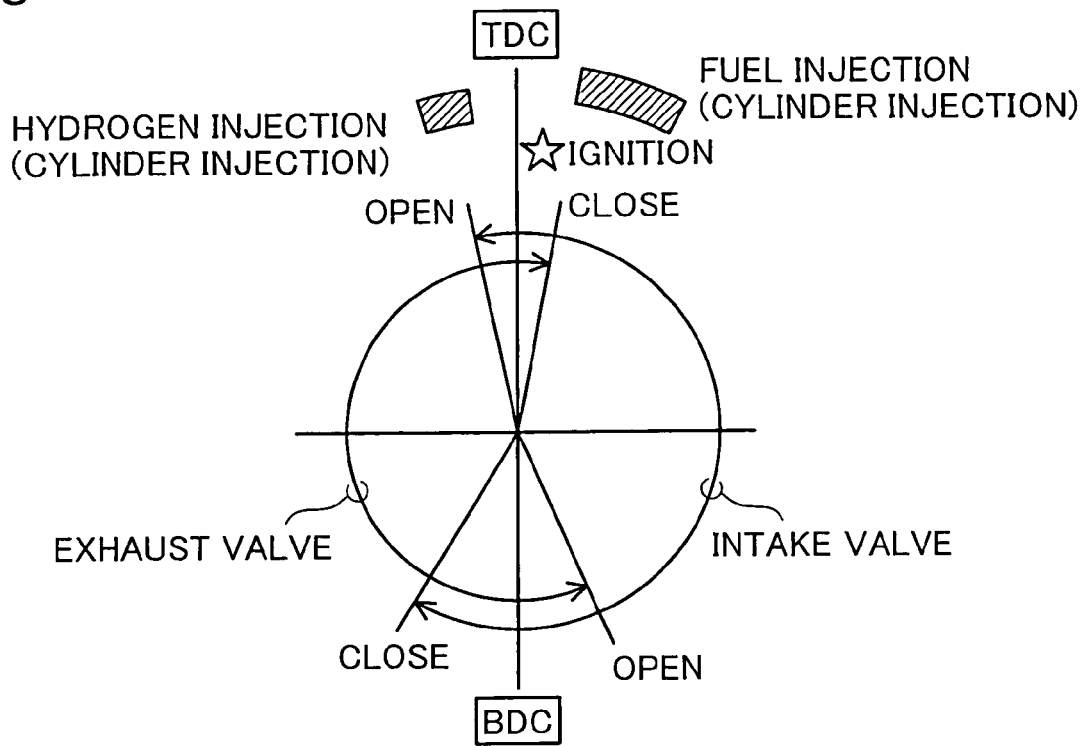
FIGS. 15A and 15B show settings of the open and close timings of the intake valve and the exhaust valve and the injection timing of the fuel in the first modified example of the first embodiment.
Figure 15B:
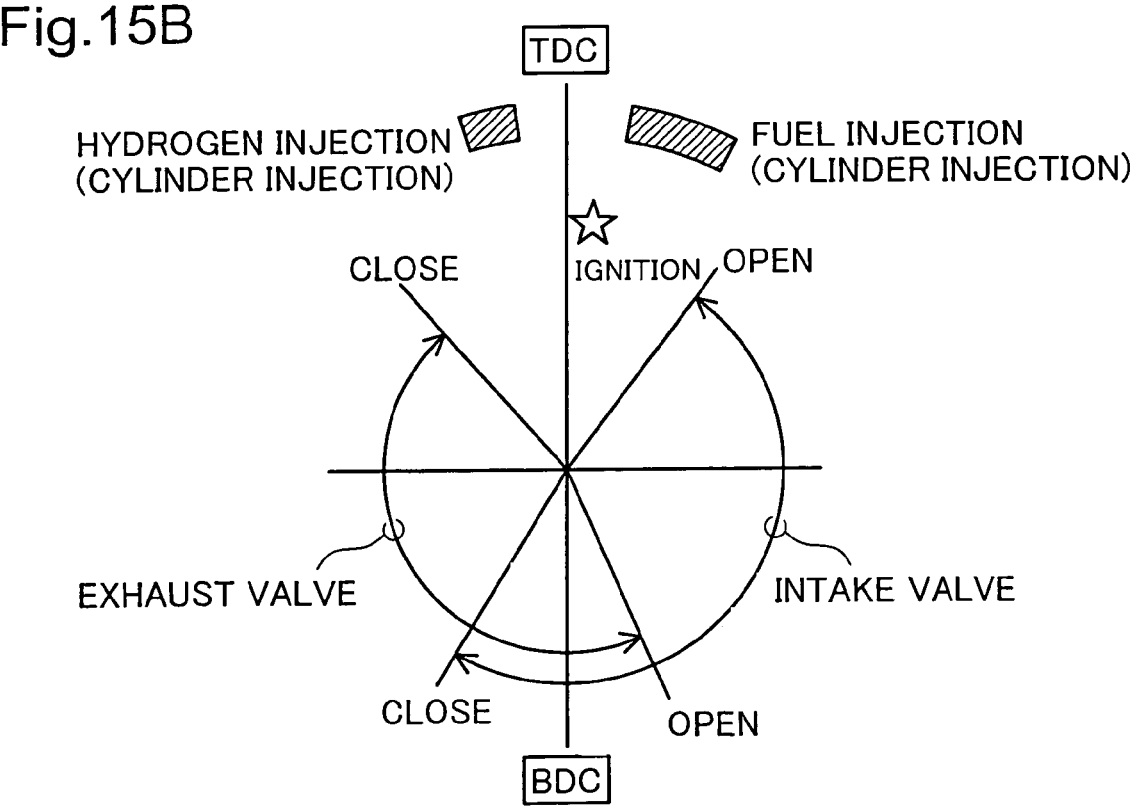

In the structure of direct injection of gasoline into the combustion chamber, gasoline is injected at a preset timing in the first half of an intake cycle. FIGS. 15A and 15B show settings of the open and close timings of the intake valve 132 and the exhaust valve 134 and the injection timing of the fuel. In one example, the exhaust valve 134 is closed at a timing after the top dead center, and the intake valve 132 is opened at a timing prior to the top dead center. In this case, gasoline is directly injected from the fuel injection valve 19 into the combustion chamber at an adequate timing in the first half of the intake cycle. The injected gasoline is then flown into the combustion chamber, together with the intake air passing through the intake valve 132. The injected gasoline flows with the air in the combustion chamber to form the substantially homogeneous air-fuel mixture.

In another example, the exhaust valve 134 is closed at a timing prior to the top dead center, and the intake valve 132 is opened at a timing after the top dead center as shown in FIG. 15B. In this case, gasoline is directly injected from the fuel injection valve 19 into the combustion chamber at an adequate timing when the piston 144 starts moving down. Injection of gasoline after a start of the down motion of the piston 144 effectively prevents the injected gasoline from being deposited on the top face of the piston 144. The injected gasoline is quickly vaporized by the high-temperature exhaust gas remaining in the combustion chamber. Gasoline is stirred in the combustion chamber by means of the air flown into the combustion chamber via the open intake valve 132, so as to form the substantially homogeneous air-fuel mixture.

Like the first embodiment, hydrogen gas is injected at a timing immediately before the top dead center in the compression cycle. The injected hydrogen gas is guided along the guide groove 143 formed on the top face of the piston 144 and is led into the recess 145 formed at the position facing the spark plug 136 on the top face of the piston 144, as shown in FIGS. 14A and 14B. The hydrogen-air mixture is ignited at an adequate timing after the top dead center in the compression cycle (see FIGS. 15A and 15B). This leads to compression and auto ignition of the gasoline-air mixture. Regulation of the ignition timing of the hydrogen gas controls the timing of auto ignition of the gasoline-air mixture and thus effectively prevents the occurrence of knocking.

(2) Second Modified Example

In the structures of the first embodiment and its first modified example, the spark plug 136 is located at a position separate from the fuel injection valve 14 for injection of hydrogen gas, and the guide groove 143 is formed on the top face of the piston 144 to lead the injected hydrogen gas to the periphery of the spark plug 136. In another modified structure, the spark plug 136 is located in a neighborhood of the fuel injection valve 14 for injection of hydrogen gas.

Figure 16A:
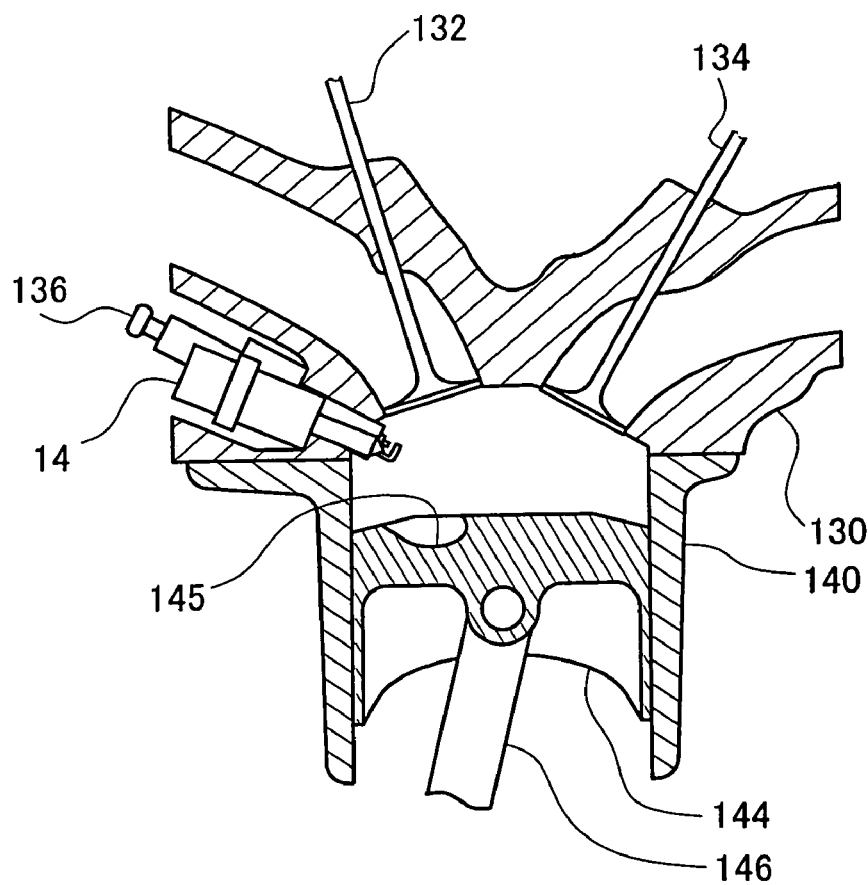
FIGS. 16A and 16B illustrate the structure of a combustion chamber in an engine of a second modified example of the first embodiment.
Figure 16B:
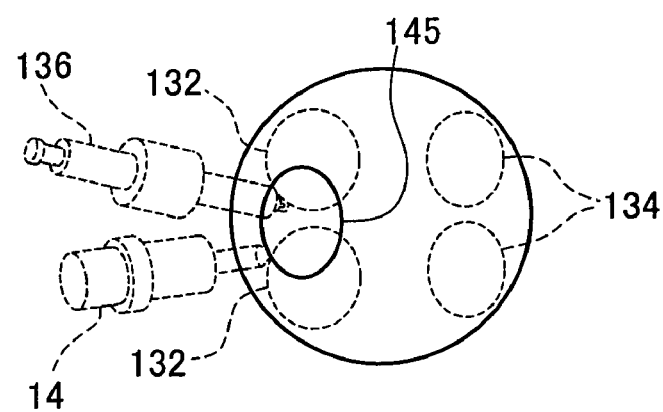

FIG. 16A and 16B illustrate the structure of a combustion chamber in still another engine in a second modified example of the first embodiment. FIG. 16A is a sectional view of the combustion chamber, and FIG. 16B is a top view showing the top face of the piston 144 seen from the cylinder head 130. In the engine of the second modified example, the spark plug 136 is located in the vicinity of the fuel injection valve 14 for injection of hydrogen gas. The recess 145 is formed at a position facing the fuel injection valve 14 and the spark plug 136 on the top face of the piston 144. The hydrogen gas is injected from the fuel injection valve 14 into the combustion chamber, when the piston 144 is close to the top dead center in the compression cycle. The injected hydrogen gas forms the hydrogen-air mixture in the recess 145 formed on the top face of the piston 144 and is ignited with a spark of the spark plug 136 at an adequate timing after the top dead center in the compression cycle.

In the engine of the second modified example, the injected hydrogen gas does not pass through the guide groove 143 as in the structures of the first embodiment and its first modified example, but is immediately supplied to the recess 145. This modified structure does not require the operation or the time of leading the hydrogen gas to the recess 145. The injection timing of hydrogen gas can thus be closer to the ignition timing. The structure ensures ignition of the hydrogen gas prior to diffusion to a wider area, thereby desirably reducing the required quantity of the injected hydrogen gas. This desirably saves the hydrogen gas and reduces the required capacity of the hydrogen storage tank 170 attached to the engine. As described previously, the hydrogen gas has a wide ignition range. The hydrogen gas having a slightly high concentration can thus be ignited effectively with a spark of the spark plug 136. The hydrogen-air mixture is thus reliably ignitable even under the condition of a shorter time period between injection of the hydrogen gas and actual ignition of the hydrogen-air mixture.

(3) Third Modified Example

In the structures of the first embodiment and its first and second modified examples, the recess 145 for collecting the hydrogen-air mixture is formed on the top face of the piston 144. A recess may alternatively be formed on the cylinder head 130, or recesses may be formed on both the top face of the piston 144 and the opposed face of the cylinder head 130.

Figure 17A:
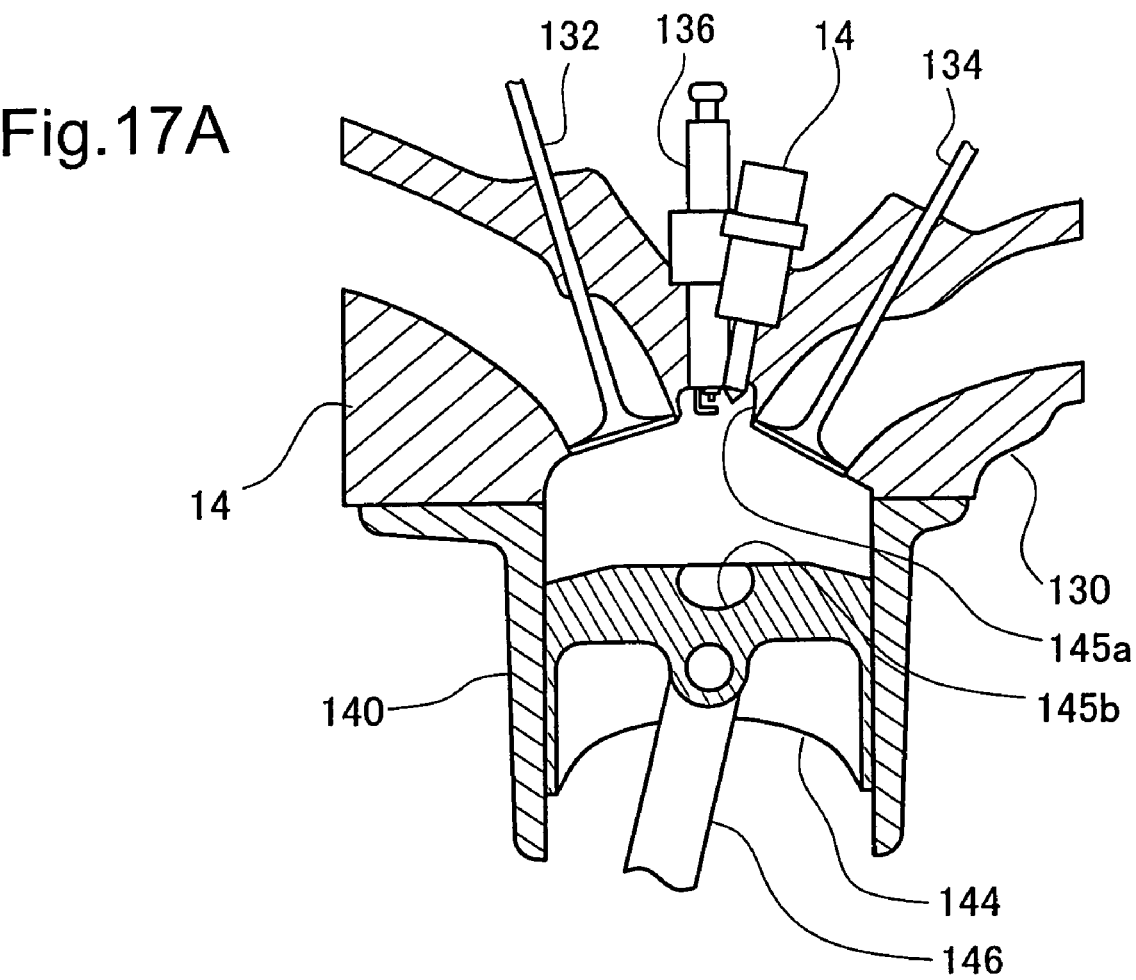
FIGS. 17A and 17B illustrate the structure of a combustion chamber in an engine of a third modified example of the first embodiment.
Figure 17B:
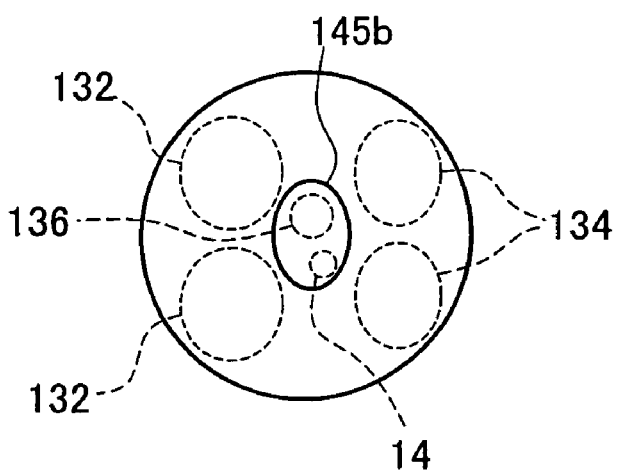

FIGS. 17A and 17B illustrate the structure of a combustion chamber in another engine in a third modified example of the first embodiment. FIG. 17A is a sectional view of the combustion chamber, and FIG. 17B is a top view showing the top face of the piston 144 seen from the cylinder head 130. In the engine of the third modified example, a recess 145a is formed on the cylinder head 130, and the fuel injection valve 14 for injection of hydrogen gas and the spark plug 136 are disposed in this recess 145a. Another recess 145b is formed at a position facing the recess 145a on the top face of the piston 144.

In the engine of the third modified example, the hydrogen gas is injected from the fuel injection valve 14 into the combustion chamber when the piston 144 is close to the top dead center in the compression cycle. The injected hydrogen gas stays in a space defined by the recess 145a and the recess 145b to form the hydrogen-air mixture. The structure effectively prevents the injected hydrogen gas from being diffused to a wider area in the combustion chamber and thereby reduces the required quantity of the injected hydrogen gas. This desirably saves the hydrogen gas and reduces the required capacity of the hydrogen storage tank 170 attached to the engine.

B. Second Embodiment

In the structure of the first embodiment discussed above, the engine 10 is a 4-cycle engine. The technique of the present invention is, however, not restricted to the 4-cycle engines but is applicable to other types of engines. The technique of the present invention is applied to another engine 300, which changes over its drive mode between a 4-cycle drive mode and a 2-cycle drive mode according to the driving conditions of the engine 300, as a second embodiment.

B-1. Structure of System

Figure 18:
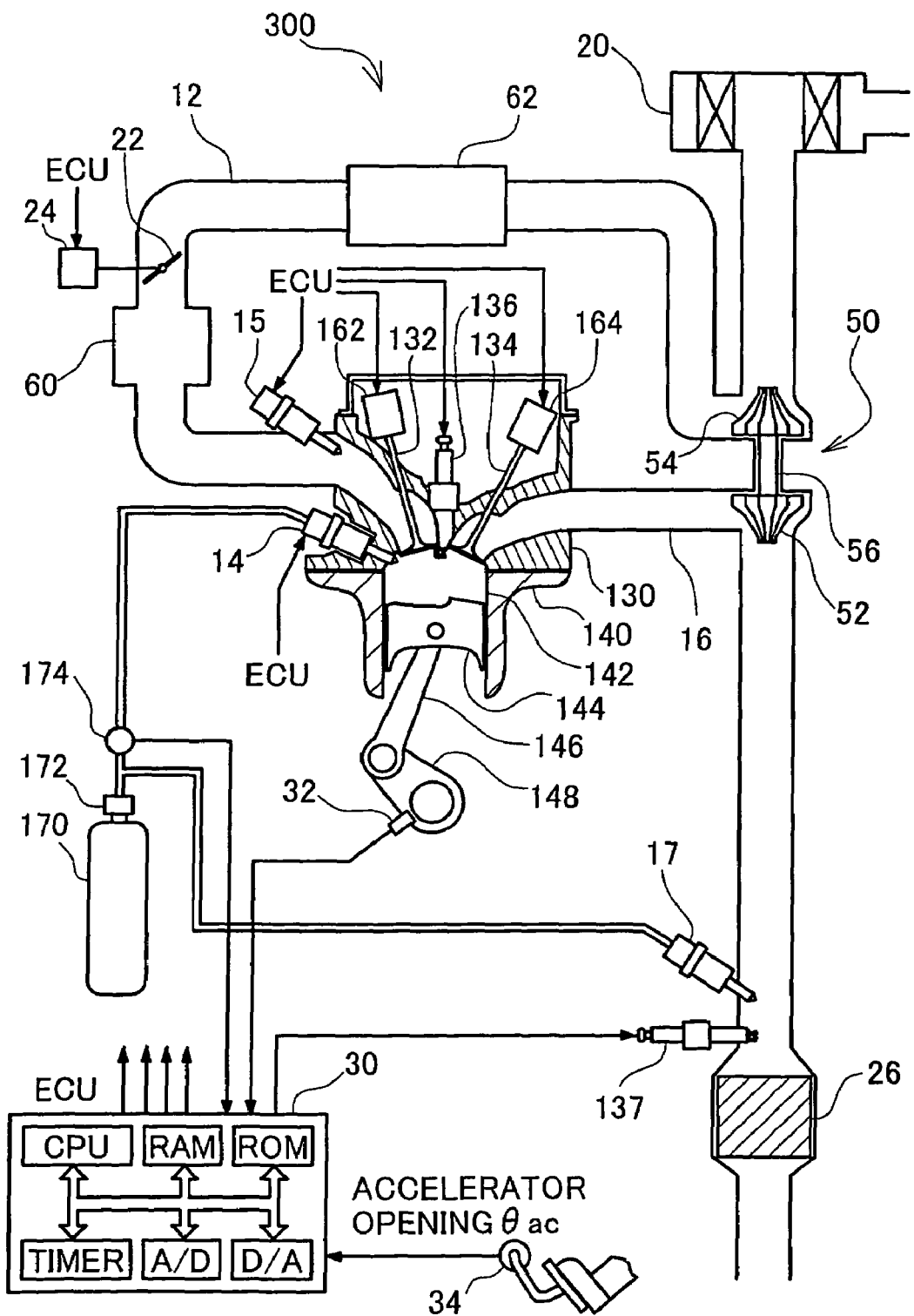
FIG. 18 conceptually illustrates the structure of an engine in a second embodiment of the present invention.

FIG. 18 conceptually illustrates the structure of the engine 300 in the second embodiment of the present invention. The engine 300 of the second embodiment has a similar structure to that of the engine 10 of the first embodiment shown in FIG. 1, except some differences discussed below.

In the engine 300 of the second embodiment, the intake valve 132 and the exhaust valve 134 are respectively driven by power actuators 162 and 164. Each of the power actuators 162 and 164 has a laminate structure including multiple disc-shaped piezoelectric elements. The engine control unit (hereafter referred to as ECU) 30 outputs signals to vary the voltages applied to the piezoelectric elements. In response to the varying voltages, the power actuators 162 and 164 open and close the intake valve 132 and the exhaust valve 134 at arbitrary timings.

The engine 300 of the second embodiment has a supercharger 50 disposed in the exhaust conduit 16. The supercharger 50 includes a turbine 52 located in the exhaust conduit 16, a compressor 54 disposed in the intake conduit 12, and a shaft 56 connecting the turbine 52 with the compressor 54. When the exhaust gas spouted from the combustion chamber passes through the exhaust conduit 16 and rotates the turbine 52, the compressor 54 is actuated via the shaft 56 to pressurize the intake air in the intake conduit 12. The engine 300 of the second embodiment also has an intercooler 62 and a surge tank 60 arranged in the intake conduit 12. The intercooler 62 functions to cool down the intake air that is pressurized by the compressor 54 and accordingly has the raised temperature. The surge tank 60 functions to relieve the pressure waves produced when the intake air is drawn into the combustion chamber.

Like the engine 10 of the first embodiment, the engine 300 of the second embodiment is under control of the ECU 30. The ECU 30 detects the engine rotation speed Ne and the accelerator opening θac and changes over the drive mode of the engine 300 between a 4-cycle drive mode and a 2-cycle drive mode, based on the detected values. As is known in the art, the 4-cycle drive mode carries out one set of intake, combustion, and exhaust of the air-fuel mixture per two reciprocating motions of a piston. The 2-cycle drive mode, on the other hand, carries out one set of intake, combustion, and exhaust of the air-fuel mixture per one reciprocating motion of the piston. The ECU 30 varies the timings of opening and closing the intake valve 132 and the exhaust valve 134 and the actuation timings of the fuel injection valves 14 and 15 and the spark plug 136 synchronously with the motions of the piston 144, thereby changing over the drive mode of the engine 300 between the 4-cycle drive mode and the 2-cycle drive mode.

Figure 19:
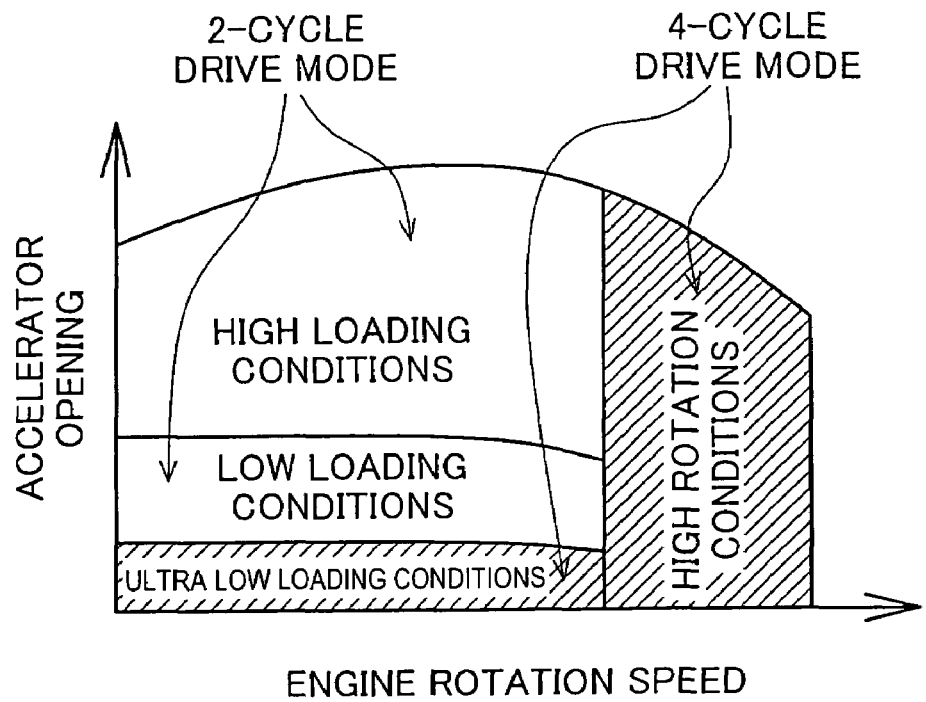
FIG. 19 shows settings of a 4-cycle drive mode and a 2-cycle drive mode selectable according to engine driving conditions in the second embodiment.

FIG. 19 shows settings of the 4-cycle drive mode and the 2-cycle drive mode selectable according to the engine driving conditions. The hatched areas represent areas in the 4-cycle drive mode. The 4-cycle drive mode is selected under the conditions of very low settings of the accelerator opening θac (ultra low loading conditions) and under the conditions of high settings of the engine rotation speed Ne (high rotation conditions), while otherwise the 2-cycle drive mode is selected.

In the area of the very low settings of the accelerator opening θac, the reduced quantity of the intake air and the reduced quantity of the fuel are introduced into the combustion chamber. This lowers the pressure at a start of compression of the air-fuel mixture in the combustion chamber. The air-fuel mixture is thus not readily auto-ignited through compression by the piston. In such cases, the 4-cycle drive mode is selected to keep the favorable engine driving conditions.

The 2-cycle drive mode carries out one set of intake, combustion, and exhaust of the air-fuel mixture per one reciprocating motion of the piston. Under the conditions of the high settings of the engine rotation speed Ne, it is difficult to attain the series of intake, combustion and exhaust efficiently. In such cases, the 4-cycle drive mode is selected to enable the engine to be driven favorably under the high settings of the engine rotation speed Ne.

The 2-cycle drive mode is selected under the driving conditions of neither so high settings of the engine rotation speed Ne nor very low settings of the accelerator opening θac. The 2-cycle drive mode outputs a torque per one reciprocating motion of the piston. The 2-cycle drive mode can thus produce a greater torque than the 4-cycle drive mode. In the 2-cycle drive mode, the control under the conditions of relatively low settings of the accelerator opening θac (low loading conditions) is different from the control under the conditions of high settings of the accelerator opening θac (high loading conditions).

B-2. Combustion Control of Air-Fuel Mixture in Second Embodiment

Figure 20:
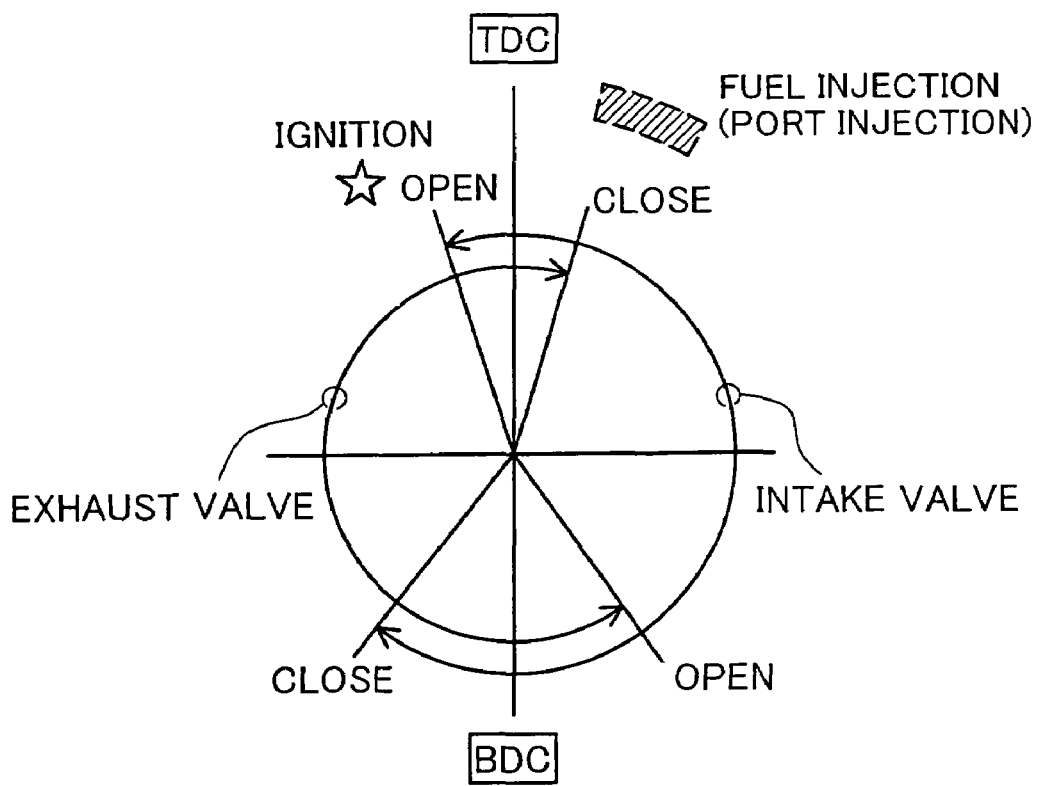
FIG. 20 shows settings of the open and close timings of the intake valve and the exhaust valve, the injection timing of the fuel, and the ignition timing synchronously with the motion of a piston in the 4-cycle drive mode.

The engine 300 of the second embodiment controls the combustion state of the air-fuel mixture in the following manner, while changing over its drive mode between the 4-cycle drive mode and the 2-cycle drive mode according to the engine driving conditions. FIG. 20 shows settings of the open and close timings of the intake valve 132 and the exhaust valve 134 synchronously with the motion of the piston 144 in the 4-cycle drive mode. FIG. 20 also shows the timing of actuating the fuel injection valve 15 to inject gasoline into the intake conduit 12 and the timing of making a spark emitted from the spark plug 136 to ignite the gasoline-air mixture.

Opening the intake valve 132 at a timing when the piston 144 is close to the top dead center (TDC) enables the air-fuel mixture in the intake conduit 12 to be drawn into the combustion chamber synchronously with a down motion of the piston 144. The intake valve 132 is then closed in the vicinity of the bottom dead center (BDC) to compress the air-fuel mixture. The air-fuel mixture is ignited at a preset timing prior to the top dead center to be combusted and produce a torque. Gasoline is injected from the fuel injection valve 15 disposed in the intake conduit 12. At this timing, the intake valve 132 is closed, so that the injected gasoline is vaporized to form the air-fuel mixture in the intake conduit 12.

Figure 21:
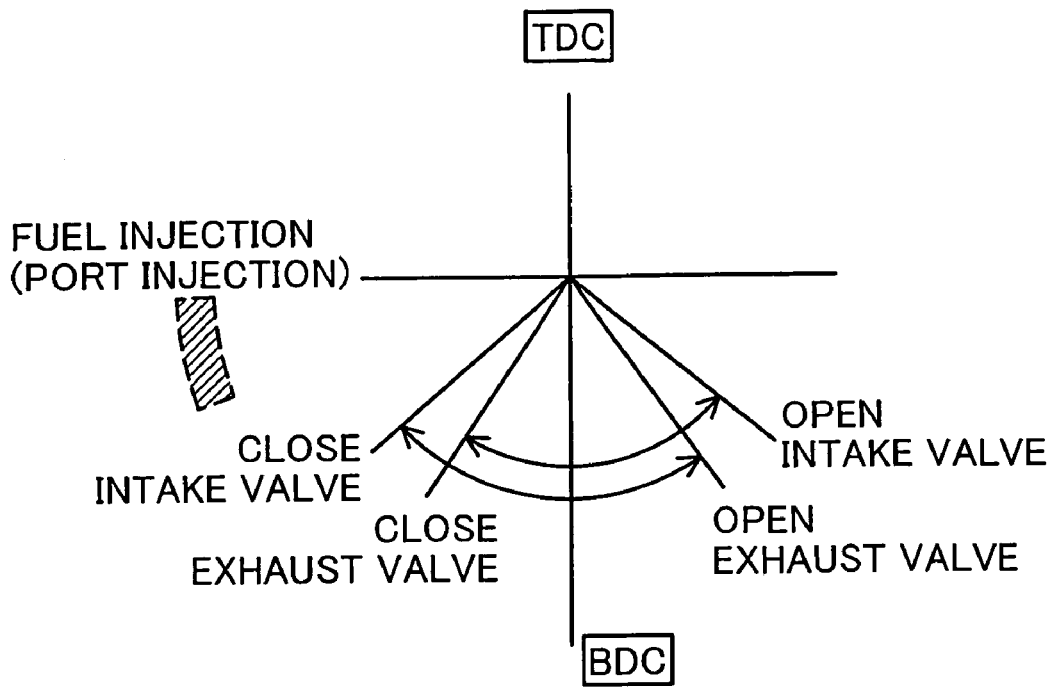
FIG. 21 shows settings of the open and close timing of the intake valve and the exhaust valve and the injection timing of the fuel synchronously with the motion of the piston in the 2-cycle drive mode under the low loading conditions.

Under the conditions of neither so high settings of the engine rotation speed Ne nor very low settings of the accelerator opening θac (in the area of the low loading conditions in the map of FIG. 19), the fuel injection valve 15 is actuated while the intake valve 132 and the exhaust valve 134 are opened and closed at timings shown in FIG. 21. The operations of the engine 300 under the low loading conditions are briefly described with reference to FIG. 21.

As a matter of convenience, explanation starts from the state in which the piston 144 exceeds the bottom dead center and the intake valve 132 is closed. At this timing, the air-fuel mixture flown via the open intake valve 132 is present in the combustion chamber. An up motion of the piston 144 gradually compresses the air-fuel mixture flown into the combustion chamber. While the air-fuel mixture is compressed by the up motion of the piston 144, gasoline is injected from the fuel injection valve 15 into the intake conduit 12. At this timing, the intake valve 132 is closed, so that the injected gasoline is vaporized to form the air-fuel mixture in the intake conduit 12.

The air-fuel mixture in the combustion chamber is compressed with the up motion of the piston 144, and is auto-ignited to quickly complete combustion when the piston 144 approaches to the top dead center. Combustion of the air-fuel mixture raises the internal pressure of the combustion chamber. The crankshaft 148 is then rotated to move the piston 144 down and convert the internal pressure of the combustion chamber into a torque. With the down motion of the piston 144, the internal pressure of the combustion chamber is gradually lowered. The exhaust valve 134 is opened at a preset timing before the piston 144 reaches the bottom dead center. The combustion gas is then spouted from the exhaust valve 134 to the exhaust conduit 16. The spouted exhaust gas rotates the turbine 52 disposed in the exhaust conduit 16 and actuates the compressor 54 to supercharge the intake air.

The spout of the exhaust gas via the exhaust valve 134 and the down motion of the piston 144 abruptly lower the pressure in the combustion chamber. The combustion gas in the combustion chamber is thus not efficiently discharged any longer. The intake valve 132 is accordingly opened at a preset timing before the piston 144 reaches the bottom dead center. The air in the intake conduit 12 has been pressurized. The pressurized air-fuel mixture is thus flown into the combustion chamber via the open intake valve 132, and the remaining combustion gas in the combustion chamber is pressed out and discharged via the exhaust valve 134. The action of simultaneously setting the exhaust valve 134 and the intake valve 132 in the open position and pressing out and discharging the remaining combustion gas in the combustion chamber by means of the air flown via the intake valve 132 is called 'scavenging'.

Discharge of the combustion gas from the combustion chamber is mostly completed at some timing after the piston 144 exceeds the bottom dead center. The exhaust valve 134 is then closed. At this timing, the intake valve 132 is still in the open position, so that the pressurized air-fuel mixture is flown from the intake conduit 12 into the combustion chamber. The pressure in the combustion chamber is heightened with the inflow of the air-fuel mixture into the combustion chamber. The inflow of the air-fuel mixture stops when the internal pressure of the combustion chamber becomes practically equal to the supercharge pressure. At this timing, the intake valve 132 is closed. The above series of operations is repeated to output a torque with compression and auto ignition of the air-fuel mixture. Driving the engine 300 under the low loading conditions with compression and auto ignition of the air-fuel mixture simultaneously and significantly reduces the emission of the air pollutants and the fuel consumption.

Figure 22:
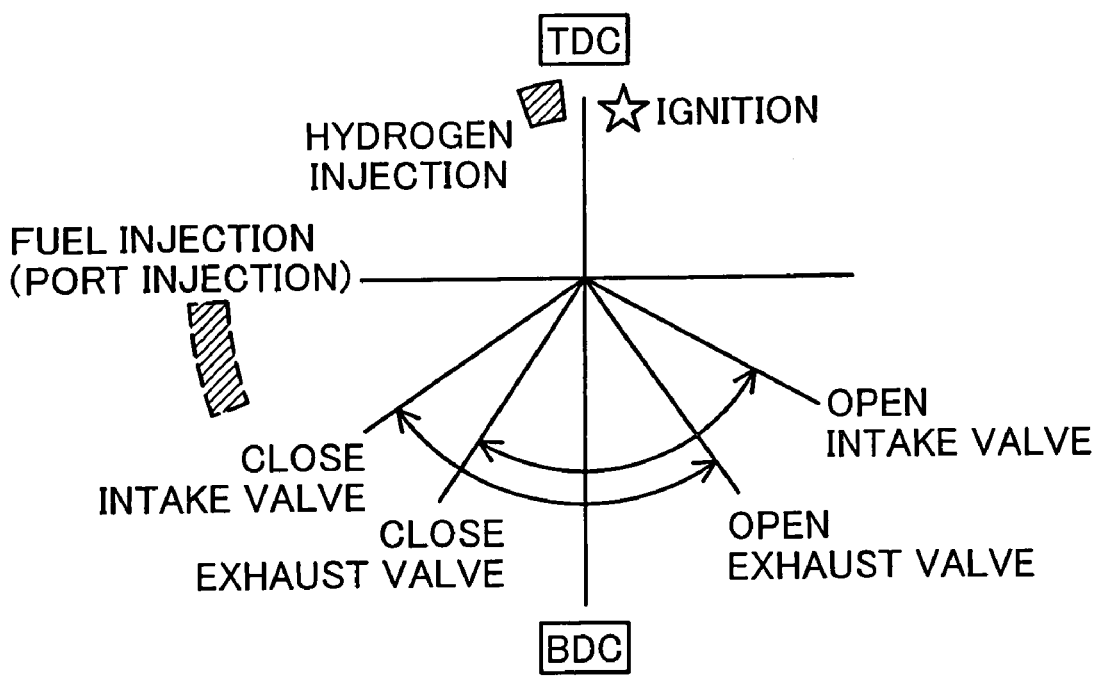
FIG. 22 shows settings of the open and close timing of the intake valve and the exhaust valve, the injection timing of the fuel, and the ignition timing synchronously with the motion of the piston in the 2-cycle drive mode under the high loading conditions.
Figure 23:
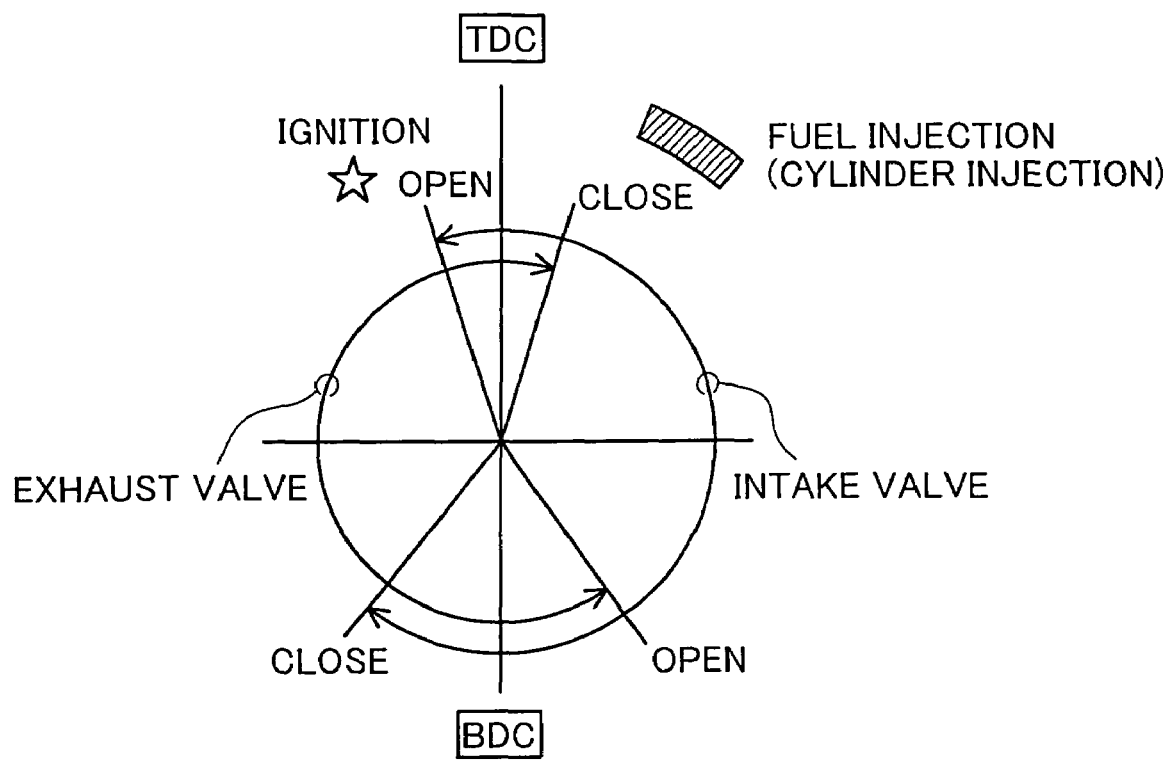
FIG. 23 shows settings of the respective timings in the 4-cycle drive mode in a structure of making gasoline directly injected into the combustion chamber.

As described in the first embodiment, the system of compressing and auto-igniting the air-fuel mixture for combustion heightens the possibility of the occurrence of knocking under high loading conditions. Under the driving conditions of not so high settings of the engine rotation speed Ne but higher settings of the accelerator opening θac than a preset level (in the area of the high loading conditions in the map of FIG. 19), the engine 300 is driven according to the following procedure to attain compression and auto ignition of the air-fuel mixture with no occurrence of knocking. FIG. 22 shows settings of the open and close timings of the intake valve 132 and the exhaust valve 134, the actuation timings of the fuel injection valves 14 and 15, and the ignition timing with a spark of the spark plug 136 under the high loading conditions. The primary differences from the timings under the low loading conditions shown in FIG. 21 are injection of the hydrogen gas and actuation of the spark plug 136. The operations of the engine 300 under the high loading conditions are described briefly with reference to FIG. 22.

As in the case of the operation under the low loading conditions, the description starts from the state in which the piston 144 exceeds the bottom dead center and the intake valve 132 is closed. When the intake valve 132 is closed and the piston 144 moves up, the air-fuel mixture is compressed in the combustion chamber. Under the high loading conditions, a sufficiently large value is set to the excess air ratio of the air-fuel mixture, in order to prevent the air-fuel mixture from being auto-ignited in the course of compression by means of the piston 144. While the piston 144 moves up to compress the air-fuel mixture, gasoline is injected from the fuel injection valve 15 disposed in the intake conduit 12 to form the air-fuel mixture in the intake conduit 12. The air-fuel mixture formed in the intake conduit 12 is flown into the combustion chamber when the intake valve 132 is opened.

At a timing immediately before the piston 144 reaches the top dead center, hydrogen gas is injected from the fuel injection valve 14 into the combustion chamber. The injection timing of hydrogen gas is set typically in a range between 30 degrees prior to the top dead center of the piston and the top dead center.

Like the engine 10 of the first embodiment, in the engine 300 of the second embodiment, the recess 145 and the guide groove 143 are formed on the top face of the piston 144. The injected hydrogen gas forms the hydrogen-air mixture in the recess 145. The hydrogen-air mixture produced in the recess 145 is ignited with a spark of the spark plug 136 at a timing when the piston 144 exceeds the top dead center. The hydrogen-air mixture is then quickly combusted to compress the gasoline-air mixture surrounding the hydrogen-air mixture. The gasoline-air mixture formed in the combustion chamber has the excess air ratio of a sufficiently large value that prevents auto ignition in the course of compression by means of the piston 144. Combustion of the hydrogen-air mixture further compresses and thereby auto-ignites the gasoline-air mixture. Regulation of the ignition timing of the hydrogen gas controls the timing of auto ignition of the air-fuel mixture in the combustion chamber. As discussed previously, the hydrogen-air mixture has a high octane value, so that the mixture of the air and the hydrogen gas injected into the combustion chamber is not auto-ignited spontaneously. The hydrogen-air mixture has a wide ignition range and a short ignition delay time and is thus effectively ignitable with a spark of the spark plug 136 at an accurate timing.

Auto ignition of the air-fuel mixture raises the internal pressure of the combustion chamber. The pressure in the combustion chamber is converted to a torque when the crankshaft 148 is rotated to move the piston 144 down. The exhaust valve 134 is opened at a preset timing before the piston 144 reaches the bottom dead center. The combustion gas is then spouted from the combustion chamber into the exhaust conduit 16. The spout of the exhaust gas rotates the turbine 52 disposed in the exhaust conduit 16 and actuates the compressor 54 to supercharge the intake air. In response to the opening action of the intake valve combustion chamber at a timing of the open intake valve 132 in the first half of the intake cycle. The injected gasoline then flows together with the intake air flown via the intake valve 132 to form the substantially homogeneous air-fuel mixture in the combustion chamber.

Figure 24A:
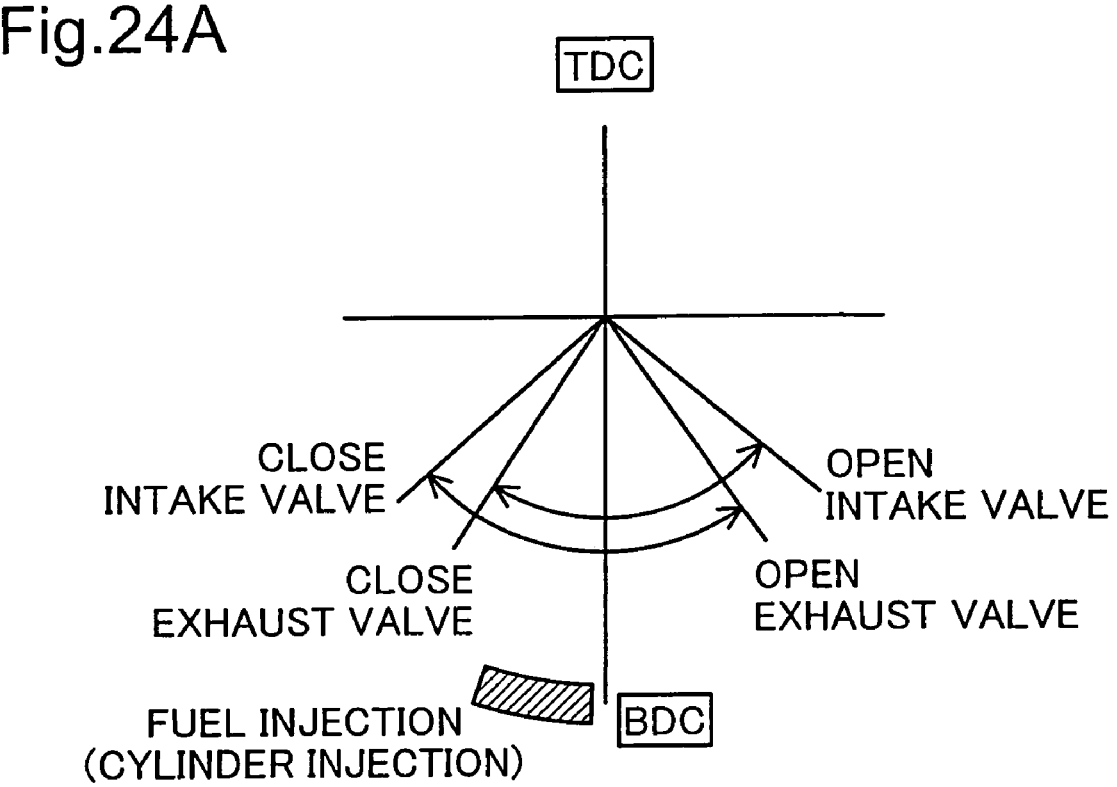
FIGS. 24A and 24B show settings of the respective timings in the 2-cycle drive mode in the structure of making gasoline directly injected into the combustion chamber.
Figure 24B:
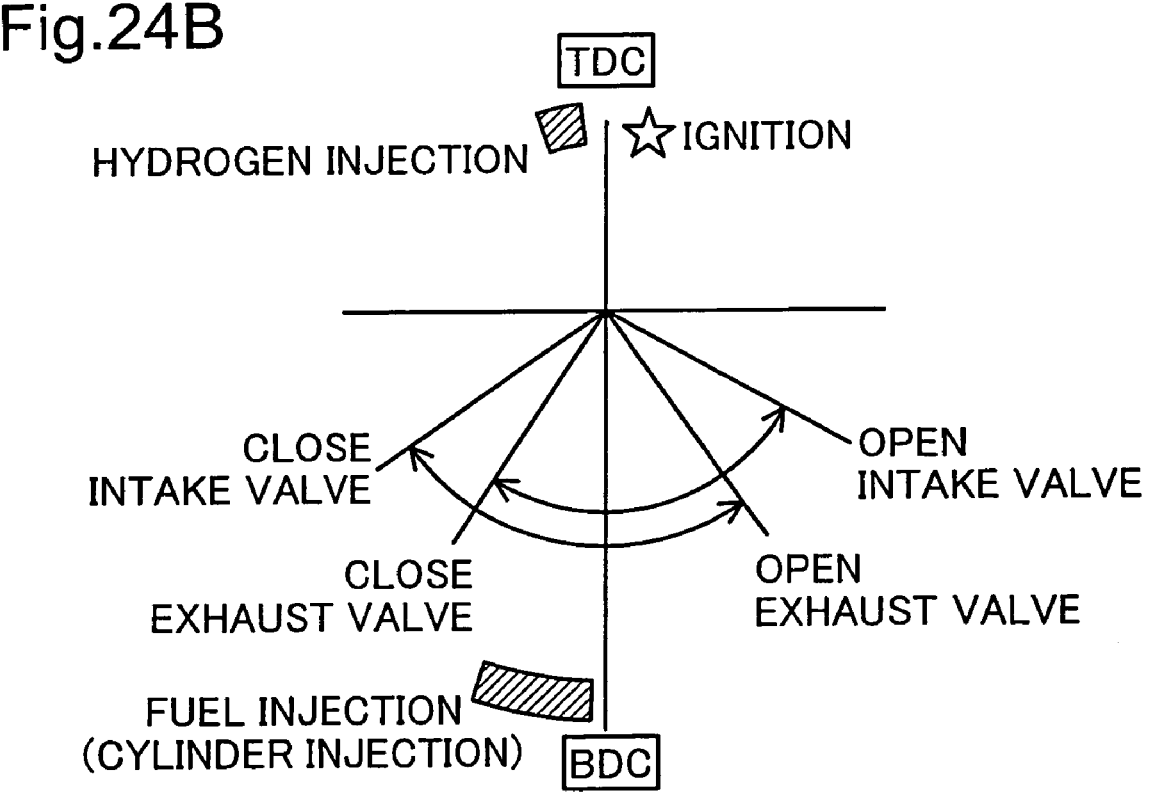

In the 2-cycle drive mode, as shown in FIGS. 24A and 24B, gasoline is injected from the fuel injection valve 19 into the combustion chamber at a timing when the piston 144 exceeds the bottom dead center in the latter half, of the scavenging cycle. At this timing, discharge of the combustion gas from the combustion chamber is mostly completed. This effectively prevents the injected gasoline from being discharged from the exhaust valve 134. The injected gasoline is quickly vaporized by the effects of the high-temperature combustion gas remaining in the combustion chamber and is mixed with the air to produce the substantially homogeneous air-fuel mixture before the piston 144 reaches the top dead center.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. An internal combustion engine that compresses an air-fuel mixture containing a fuel and the air in a combustion chamber and makes the compressed air-fuel mixture subjected to combustion, so as to output power, said internal combustion engine comprising:
    an air-fuel mixture compression mechanism that compresses the air-fuel mixture in said combustion chamber;
    a first fuel-air mixture production module that produces a first fuel-air mixture in a manifold containing a first fuel and the air at a specific ratio, which avoids auto ignition of the first fuel-air mixture through the compression by said air-fuel mixture compression mechanism, in said combustion chamber;
    a second fuel-air mixture production module that supplies a second fuel, which is different from the first fuel, into a partial area of said combustion chamber to produce a second fuel-air mixture; and
    an ignition module that ignites the second fuel-air mixture to compress and auto-ignite the first fuel-air mixture after producing said first fuel-air mixture.

2. An internal combustion engine in accordance with claim 1, wherein said second fuel-air mixture production module injects, as the second fuel, a fuel having a higher octane value than that of the first fuel, so as to produce the second fuel-air mixture.

3. An internal combustion engine in accordance with claim 2, wherein said second fuel-air mixture production module injects, as the second fuel, hydrogen gas, so as to produce the second fuel-air mixture.

4. An internal combustion engine in accordance with claim 1, wherein said second fuel-air mixture production module injects, as the second fuel, a combustible gas, so as to produce the second fuel-air mixture.

5. An internal combustion engine in accordance with claim 4, said internal combustion engine further comprising:
    a cylinder injection valve that directly injects the second fuel into said combustion chamber,
    wherein said fuel-air mixture compression mechanism rotates a crankshaft to lift a piston up in said combustion chamber, thereby compressing the air-fuel mixture in said combustion chamber, and said second fuel-air mixture production module makes the second fuel injected from said cylinder injection valve to produce the second fuel-air mixture in a preset term from 30 degrees as a rotational angle of said crankshaft prior to a top dead center in a compression cycle, at which said piston reaches its maximum height after compression of the air-fuel mixture, to the top dead center in the compression cycle.

6. An internal combustion engine in accordance with claim 5, wherein a recess is formed on a top face of said piston, where the second fuel injected from said cylinder injection valve forms the second fuel-air mixture.

7. An internal combustion engine in accordance with claim 6, wherein said recess is located on a substantial center on the top face of said piston.

8. An internal combustion engine in accordance with claim 6, wherein said recess has a rim defined by a side wall of said recess crossing the top face of said piston to at least partly form a sharp edge.

9. An internal combustion engine in accordance with claim 6, wherein the top face of said piston has a guide groove to guide the second fuel injected from said cylinder injection valve to said recess.

10. An internal combustion engine in accordance with claim 5, wherein said second fuel-air mixture production module makes the second fuel injected from said cylinder injection valve to produce the second fuel-air mixture at a certain time specified relative to an ignition timing of the second fuel-air mixture by said ignition module.

11. An internal combustion engine in accordance with claim 10, said internal combustion engine further comprising:

a delay factor detection module that detects a factor of delaying an ignition timing; and an ignition timing delay module that, when the detected factor reaches or exceeds a preset level, delays the ignition timing of the second fuel-air mixture, wherein said second fuel-air mixture production module comprises a production timing delay module that delays an injection timing of the second fuel, in combination with a delay of the ignition timing, so as to delay a production timing of the second fuel-air mixture.

12. An internal combustion engine in accordance with claim 11, wherein the delay factor detected by said delay factor detection module is either of a frequency of occurrence of knocking in said internal combustion engine and a concentration of nitrogen oxides included in an exhaust gas discharged from said combustion chamber.

13. An internal combustion engine in accordance with claim 1, wherein said second fuel-air mixture production module injects, as the second fuel, an alcohol, so as to produce the second fuel-air mixture.

14. An internal combustion engine in accordance with claim 13, wherein the second fuel is methyl alcohol.

15. An internal combustion engine in accordance with claim 13, said internal combustion engine further comprising:

a cylinder injection valve that directly injects the second fuel into said combustion chamber, wherein said fuel-air mixture compression mechanism rotates a crankshaft to lift a piston up in said combustion chamber, thereby compressing the air-fuel mixture in said combustion chamber, and said second fuel-air mixture production module makes the second fuel injected from said cylinder injection valve to produce the second fuel-air mixture in a preset term from 90 degrees as a rotational angle of said crankshaft prior to a top dead center in a compression cycle, at which said piston reaches its maximum height after compression of the air-fuel mixture, to 30 degrees as a rotational angle of said crankshaft prior to the top dead center in the compression cycle.

16. An internal combustion engine in accordance with claim 1, said internal combustion engine further comprising:

a third fuel-air mixture production module that produces a third fuel-air mixture containing the first fuel and the air at a preset ratio, which allows for auto ignition of the third fuel-air mixture through compression by said air-fuel mixture compression mechanism, in said combustion chamber;

a required torque detection module that detects a required torque to be output from said internal combustion engine; and a fuel-air mixture production control module that, when the detected required torque is not greater than a predetermined threshold value, prohibits operations of said first fuel-air mixture production module and said second fuel-air mixture production module.

17. An internal combustion engine in accordance with claim 1, said internal combustion engine further comprising:

a third fuel-air mixture production module that produces a third fuel-air mixture containing the first fuel and the air at a preset ratio, which allows for auto ignition of the third fuel-air mixture through compression by said air-fuel mixture compression mechanism, in said combustion chamber;

a required torque detection module that detects a required torque to be output from said internal combustion engine; and a fuel-air mixture production prohibition module that, when the detected required torque exceeds a predetermined threshold value, prohibits operations of said third fuel-air mixture production module.

18. An internal combustion engine in accordance with claim 1, said internal combustion engine further comprising:

a third fuel-air mixture production module that produces a third fuel-air mixture containing the first fuel and the air at a preset ratio, which allows for auto ignition of the third fuel-air mixture through compression by said air-fuel mixture compression mechanism, in said combustion chamber;

a required torque detection module that detects a required torque to be output from said internal combustion engine; and a fuel-air mixture production control module that, when the detected required torque is not greater than a predetermined threshold value, prohibits operations of said first fuel-air mixture production module and said second fuel-air mixture production module, and when the detected required torque exceeds the predetermined threshold value, prohibits operations of said third fuel-air mixture production module.

19. An internal combustion engine in accordance with claim 18, wherein said fuel-air mixture production control module prohibits operations of said ignition module, when the detected required torque is not greater than the predetermined threshold value.

20. An internal combustion engine in accordance with claim 1, said internal combustion engine comprising:

an intake conduit, which a flow of the air supplied into said combustion chamber passes through;

an intake valve that opens and closes said intake conduit, wherein said first fuel-air mixture production module makes the first fuel injected into said intake conduit upstream said intake valve to produce the first fuel-air mixture, and said second fuel-air mixture production module makes the second fuel injected into said combustion chamber to produce the second fuel-air mixture.

21. An internal combustion engine in accordance with claim 1, said internal combustion engine comprising:

an exhaust conduit, which a flow of an exhaust gas discharged from said combustion chamber passes through;

a conversion catalyst that is disposed in said exhaust conduit to convert a harmful component included in the exhaust gas; and a catalyst warm-up module that makes the second fuel injected from an upstream side of said conversion catalyst into said exhaust conduit and ignites the injected second fuel, so as to warm said conversion catalyst up.

22. A control method of an internal combustion engine, which compresses an air-fuel mixture containing a fuel and the air in a combustion chamber and makes the compressed air-fuel mixture subjected to combustion, so as to output power, said control method comprising:

a first step of producing a first fuel-air mixture in a manifold containing a first fuel and the air at a specific ratio, which avoids auto ignition of the first fuel-air mixture through the compression, in said combustion chamber;

a second step of supplying a second fuel, which is different from the first fuel, into a partial area of said combustion chamber to produce a second fuel-air mixture; and a third step of igniting the second fuel-air mixture to compress and auto-ignite the first fuel-air mixture after producing said first fuel-air mixture.

23. A control method in accordance with claim 22, wherein said second step injects, as the second fuel, a fuel having a higher octane value than that of the first fuel, so as to produce the second fuel-air mixture.

24. A control method in accordance with claim 22, wherein said second step injects, as the second fuel, a combustible gas, so as to produce the second fuel-air mixture.

25. A control method in accordance with claim 22, wherein said second step injects, as the second fuel, an alcohol, so as to produce the second fuel-air mixture.

* * * * *